US012668265B2

(12) United States Patent
Zhang et al.

(10) Patent No.: US 12,668,265 B2
(45) Date of Patent: Jun. 30, 2026

(54) SELF-DRIVING METHOD, TRAINING METHOD, AND RELATED APPARATUS

(71) Applicant: Huawei Technologies Co., Ltd., Shenzhen (CN)

(72) Inventors: Xing Zhang, Shenzhen (CN); Lin Lan, Shenzhen (CN); Zhenguo Li, Hong Kong (CN); Li Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1062 days.

(21) Appl. No.: 17/198,937

(22) Filed: Mar. 11, 2021

(65) Prior Publication Data

US 2021/0197855 A1 Jul. 1, 2021

Related U.S. Application Data

(63) Continuation of application No. PCT/CN2019/117268, filed on Nov. 11, 2019.

(30) Foreign Application Priority Data

Dec. 13, 2018 (CN) .......................... 201811528036.1

(51) Int. Cl.
*G06N 3/08* (2023.01)
*B60W 60/00* (2020.01)
(Continued)

(52) U.S. Cl.
CPC ............. *B60W 60/001* (2020.02); *G06N 3/08* (2013.01); *G06N 3/092* (2023.01); *B60W 2050/0075* (2013.01); *B60W 2556/10* (2020.02)

(58) Field of Classification Search
CPC ........... B60W 60/001; B60W 2556/10; B60W 2050/0075; G06N 3/092; G06N 3/08
See application file for complete search history.

(56) References Cited

U.S. PATENT DOCUMENTS

2013/0238181 A1 9/2013 James
2017/0137222 A1 5/2017 Lert, Jr.
(Continued)

FOREIGN PATENT DOCUMENTS

CN 102233877 A 11/2011
CN 105573323 A 5/2016
(Continued)

OTHER PUBLICATIONS

Tingwu Wang, Renjie Liao, Jimmy Ba, and Sanja Fidler. Nervenet: Learning structured policy with graph neural networks. In 6th International Conference on Learning Representations, ICLR 2018, Vancouver, BC, Canada, Apr. 30-May 3, 2018, Conference Track Proceedings. OpenReview.net, 2018. (Year: 2018).*
(Continued)

*Primary Examiner* — Kakali Chaki
*Assistant Examiner* — Robert N Day
(74) *Attorney, Agent, or Firm* — Slater Matsil, LLP

(57) ABSTRACT

A self-driving method and a related apparatus, the method including determining, by a self-driving apparatus, a task feature vector of a self-driving task according to M groups of historical paths of the self-driving task, where the task feature vector is a vector representing features of the self-driving task, and where M is an integer greater than 0, determining, by the self-driving apparatus, according to the task feature vector and a status vector, a target driving operation that needs to be performed, where the status vector indicates a driving status of the self-driving apparatus, and performing, by the self-driving apparatus, the target driving operation.

18 Claims, 15 Drawing Sheets

(51) Int. Cl.
 *G06N 3/092* (2023.01)
 *B60W 50/00* (2006.01)

(56) References Cited

U.S. PATENT DOCUMENTS

| | | | |
|---|---|---|---|
| 2017/0269605 A1 | 9/2017 | Myers et al. | |
| 2018/0009445 A1* | 1/2018 | Nishi | G06N 7/01 |
| 2020/0139973 A1* | 5/2020 | Palanisamy | G08G 1/167 |

FOREIGN PATENT DOCUMENTS

| | | | |
|---|---|---|---|
| CN | 106023344 A | 10/2016 | |
| CN | 106875511 A | 6/2017 | |
| CN | 107168303 A | 9/2017 | |
| CN | 107218948 A | 9/2017 | |
| CN | 107218949 A | 9/2017 | |
| CN | 107229973 A | 10/2017 | |
| CN | 107544330 A | 1/2018 | |
| CN | 107862346 A | 3/2018 | |
| CN | 108446727 A | 8/2018 | |
| CN | 108537326 A | 9/2018 | |
| CN | 108594826 A | 9/2018 | |
| CN | 108891421 A | 11/2018 | |
| CN | 109901572 A | 6/2019 | |
| EP | 3243729 A1 | 11/2017 | |
| EP | 3373200 A1 | 9/2018 | |

OTHER PUBLICATIONS

Cathy Wu, Aravind Rajeswaran, Yan Duan, Vikash Kumar, Alexandre M Bayen, Sham Kakade, Igor Mordatch, Pieter Abbeel, "Variance Reduction for Policy Gradient with Action-Dependent Factorized Baselines," arXiv:1803.07246 (Year: 2018).*

Akrour, Riad, et al. "Regularizing reinforcement learning with state abstraction." 2018 IEEE/RSJ International Conference on Intelligent Robots and Systems (IROS). IEEE, 2018. (Year: 2018).*

Zhenguo Li, Fengwei Zhou, Fei Chen, Hang Li, "Meta-SGD: Learning to Learn Quickly for Few-Shot Learning", arXiv:1707.09835. (Year: 2017).*

Duan, Y. et al., "RL2: Fast Reinforcement Learning Via Slow Reinforcement Learning," arXiv:1611.02779v2 [cs.AI], Nov. 10, 2016, 14 pages.

Finn, C. et al., "Model-Agnostic Meta-Learning for Fast Adaption of Deep Networks," Proceedings of the 34th International Conference on Machine Learning, Sydney, Australia, PMLR 70, Jul. 18, 2017, 13 pages.

* cited by examiner

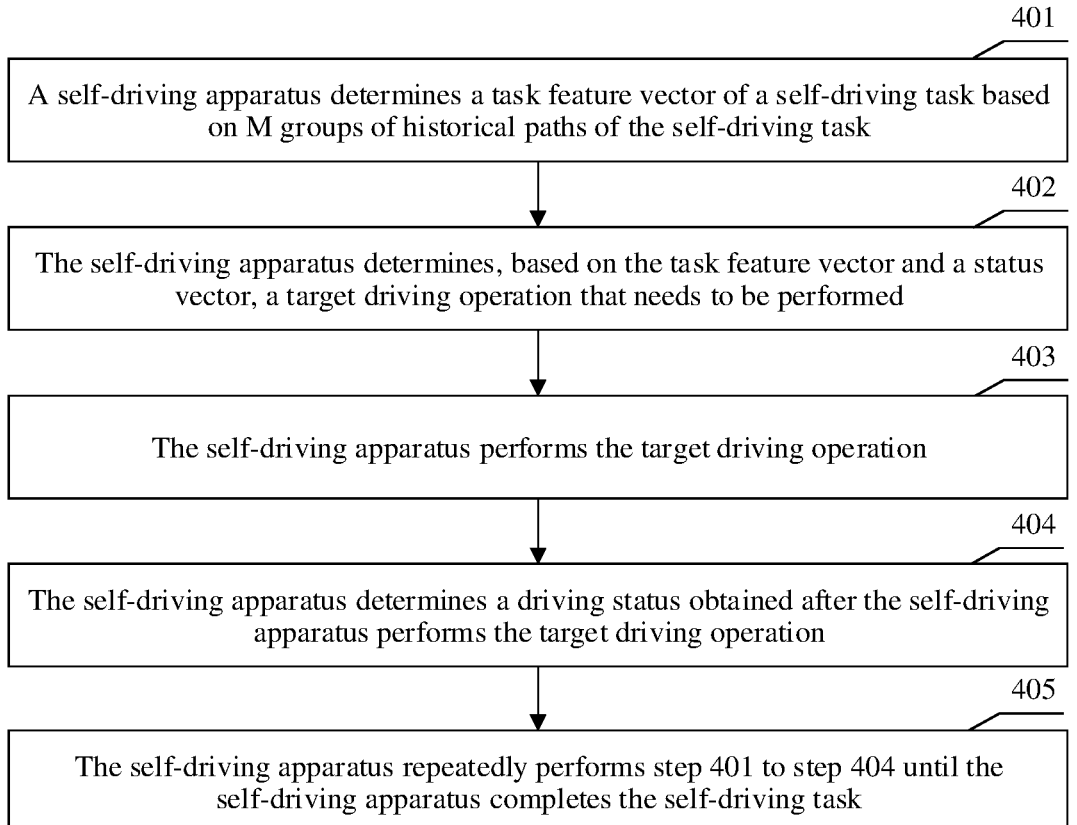

401

A self-driving apparatus determines a task feature vector of a self-driving task based on M groups of historical paths of the self-driving task

402

The self-driving apparatus determines, based on the task feature vector and a status vector, a target driving operation that needs to be performed

403

The self-driving apparatus performs the target driving operation

404

The self-driving apparatus determines a driving status obtained after the self-driving apparatus performs the target driving operation

405

The self-driving apparatus repeatedly performs step 401 to step 404 until the self-driving apparatus completes the self-driving task

A training device obtains F batches of historical paths corresponding to F
self-driving tasks

1002

The training device updates parameters of a task abstraction network based
on F losses corresponding to the F self-driving tasks

1003

The training device updates parameters of a shared policy network based on
the F losses

1101

Obtaining unit

1102

Processor

Training device

SELF-DRIVING METHOD, TRAINING METHOD, AND RELATED APPARATUS

CROSS-REFERENCE TO RELATED APPLICATIONS

This application is a continuation of International Application No. PCT/CN2019/117268, filed on Nov. 11, 2019, which claims priority to Chinese Patent Application No. 201811528036.1, filed on Dec. 13, 2018. The disclosures of the aforementioned applications are hereby incorporated by reference in their entireties.

TECHNICAL FIELD

This application relates to the artificial intelligence field, and in particular, to a self-driving method, a training method, and a related apparatus.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, the artificial intelligence is a branch of computer science, and is intended to understand the essence of intelligence and produce a new intelligent machine that can react in a manner similar to the human intelligence. The artificial intelligence is to study design principles and implementation methods of various intelligent machines, so that the machines have perceiving, reasoning, and decision-making functions. Researches in the artificial intelligence field include a robot, natural language processing, computer vision, decision-making and reasoning, human-computer interaction, recommendation and search, an AI basic theory, and the like.

Self-driving is a mainstream application in the artificial intelligence field. According to a self-driving technology, computer vision, radar, a monitoring apparatus, a global positioning system, and the like cooperate with each other, so that a motor vehicle can implement self-driving without a person's proactive operation. A self-driving vehicle uses various computing systems to help transport passengers from one location to another location. Some self-driving vehicles may require some initial input or continuous input from an operator (such as a navigator, a driver, or a passenger). A self-driving vehicle allows an operator to switch from a manual operation mode to a self-driving mode or a mode that is between a manual operation mode and a self-driving mode. Since the self-driving technology does not require a person to drive a motor vehicle, driving errors caused by people can be effectively avoided in theory, traffic accidents can be reduced, and transportation efficiency of a road can be improved. Therefore, the self-driving technology is attracting more attention.

The self-driving vehicle usually travels in a complex and changeable dynamic scenario, and usually needs to handle a driving task that has not been handled previously, for example, a parking task in a new scenario. Various driving tasks that may need to be handled by the self-driving vehicle in a traveling process cannot be enumerated, consequently, a driving policy applicable to the various driving tasks cannot be formulated. Currently, reinforcement learning is usually used to learn a driving policy applicable to a new driving task. Reinforcement learning (RL) is an important machine learning method, and has many applications in fields such as self-driving, intelligent control robots, and analysis and prediction. Reinforcement learning can be used to learn a good policy specific to a specific task. However, for another task of the same type, the previously learned policy cannot be used, in this case, a new policy needs to be trained for the new task. Consequently, efficiency of reinforcement learning is greatly reduced. For example, a network model used for automatic parking is trained through reinforcement learning, and a self-driving vehicle may automatically park in a parking space of a specific type by using the network model. However, when encountering another type of parking space, the self-driving vehicle needs to train a new network model. In actual application, the self-driving vehicle needs to obtain, for each new driving task, a large amount of training data for training, so as to learn a policy of the driving task. However, a process of obtaining the training data causes great wear and tear to the self-driving vehicle, and costs and time overheads are high. Therefore, it is necessary to study how to learn, based on a small amount of exploration and training, a good policy specific to any task.

SUMMARY

Embodiments of this application provide a self-driving method, a training method, and a related apparatus, to quickly learn a good policy for any task based on a small amount of exploration and training.

According to a first aspect, an embodiment of this application provides a self-driving method. The method includes a self-driving apparatus determines a task feature vector of a self-driving task based on M groups of historical paths of the self-driving task. The task feature vector is a vector representing features of the self-driving task, and M is an integer greater than 0. The self-driving apparatus determines, based on the task feature vector and a status vector, a target driving operation that needs to be performed. The status vector is configured to represent a driving status of the self-driving apparatus. The self-driving apparatus performs the target driving operation.

A task abstraction network is configured to extract task feature information, and a shared policy network is configured to determine, with reference to a unique feature of each task and a common feature of the tasks, a policy for processing each task, so that a better global policy can be found more quickly and accurately. This method is more generalized, and can be applied to a similar type of tasks.

In this embodiment of this application, the self-driving apparatus determines the task feature vector of the self-driving task by using the historical path of the self-driving task, and further formulates a targeted driving policy based on the task feature vector. In this way, an existing historical path can be effectively used to formulate a better driving policy.

In an optional implementation, that a self-driving apparatus determines a task feature vector of a self-driving task based on M groups of historical paths of the self-driving task includes the following steps.

The self-driving apparatus obtains the M groups of historical paths.

The self-driving apparatus performs feature extraction on the M groups of historical paths by using a task abstraction network, to obtain M groups of intermediate feature vectors. The M groups of intermediate feature vectors one-to-one correspond to the M groups of historical paths.

3

The self-driving apparatus determines the task feature vector based on the M groups of intermediate feature vectors.

In this implementation, the features of the self-driving task can be accurately and quickly extracted by using the task abstraction network.

In an optional implementation, that the self-driving apparatus determines, based on the task feature vector and a status vector, a target driving operation that needs to be performed includes the following step.

The self-driving apparatus processes the task feature vector and the status vector by using a shared policy network, to obtain the target driving operation. The shared policy network is a neural network configured to implement reinforcement learning.

In this implementation, the shared policy network determines, based on the task feature vector and the status vector, the driving operation that needs to be performed. In this way, different targeted driving policies can be formulated based on features of different self-driving tasks.

In an optional implementation, that the self-driving apparatus obtains any one of the M groups of historical paths includes the following steps.

The self-driving apparatus processes a reference feature vector and a first status vector by using the shared policy network, to obtain a first driving operation. The reference feature vector is a zero vector or a feature vector that is of the self-driving task and that is determined based on N groups of historical paths of the self-driving task. The first status vector is configured to represent a driving status of the self-driving apparatus at a first time step. N is an integer greater than 0.

The self-driving apparatus performs the first driving operation at the first time step.

The self-driving apparatus obtains a driving status of the self-driving apparatus at a second time step and a return for performing the first driving operation. The second time step is a next time step of the first time step.

The self-driving apparatus determines a group of historical paths based on information about T time steps for completing or executing the self-driving task. The T time steps include the first time step. Information about any one of the T time steps includes a driving status of the self-driving apparatus at the any time step, a driving operation performed by the self-driving apparatus at the any time step, and a return obtained by the self-driving apparatus at the any time step. T is an integer not less than 1.

In an optional implementation, before the self-driving apparatus processes the reference feature vector and the first status vector by using the shared policy network, to obtain the first driving operation, the method further includes the following steps.

The self-driving apparatus obtains the N groups of historical paths.

The self-driving apparatus updates, based on N losses corresponding to the N groups of historical paths, a group of task abstraction network parameters corresponding to the self-driving task. The N losses one-to-one correspond to the N groups of historical paths.

The self-driving apparatus performs feature extraction on the N groups of historical paths by using the task abstraction network, to obtain N intermediate feature vectors. The N intermediate feature vectors one-to-one correspond to the N groups of historical paths, and the task abstraction network processes the N groups of historical paths by using the group of task abstraction network parameters.

The self-driving apparatus determines the reference feature vector based on the N intermediate feature vectors.

In an optional implementation, that the self-driving apparatus updates, based on N losses corresponding to the N groups of historical paths, a group of task abstraction network parameters corresponding to the self-driving task includes the following step.

The self-driving apparatus updates, by using gradient values of a first loss function relative to parameters of the task abstraction network, a group of relative parameters of the task abstraction network with respect to the self-driving task. The group of task abstraction network parameters are differences between the parameters of the task abstraction network and the group of relative parameters, and the first loss function is configured to calculate a sum of the N losses.

In an optional implementation, a calculation formula of the first loss function is as follows:

$$L(\theta_{TA}) = E_\tau\left[\sum\nolimits_{t=0}^{H}\left(\log\pi_{\theta\,policy}(a_t \mid s_t,\, h(\theta_{TA}))\left(\sum\nolimits_{t'=t}^{H} r_{t'} - b(s_t)\right)\right)\right].$$

$\theta_{TA}$ represents a parameter of the task abstraction network, $\pi_{\theta policy}(a_t|s_t,\, h(\theta_{TA}))$ represents a probability that an input of the shared policy network is a status vector $s_t$ and a feature vector $h(\theta_{TA})$, and an output is a driving operation $a_t$, H is a maximum quantity of steps, and t represents a time step, $b(s_t)$ represents a reference function used to calculate a return obtained by the self-driving apparatus at the time step t, $r_t$ represents a real return obtained by the self-driving apparatus at the time step t, and $E_\tau[\ ]$ represents calculating an expectation in a bracket.

In an optional implementation, the method further includes the following steps.

The self-driving apparatus updates parameters of the task abstraction network by using gradient values of a second loss function relative to the parameters of the task abstraction network. The second loss function is configured to calculate a sum of F losses of F self-driving tasks or a mean of the F losses, the F losses one-to-one correspond to the F self-driving tasks, a loss of any one of the F self-driving tasks is obtained through calculation based on a latest batch of historical paths of the any task, and F is an integer greater than 1.

The self-driving apparatus updates parameters of the shared policy network by using gradient values of the second loss function relative to the parameters of the shared policy network.

In an optional implementation, the method further includes the following step.

The self-driving apparatus updates a target learning rate by using gradient values of the second loss function relative to the target learning rate. The target learning rate is a learning rate for updating the group of task abstraction network parameters of the task abstraction network with respect to the self-driving task.

In an optional implementation, a calculation formula of the second loss function is as follows:

$$L(\theta) = E_t[\min\{r_t(\theta)A_t, \operatorname{clip}(r_t(\theta), 1-\varepsilon, 1+\varepsilon, r_t(\theta))A_t\} - \beta KL\,[\pi_{\theta_{old}}, \pi_\theta]].$$

$\theta = \{\theta_{TA},\, \theta_{policy},\, \alpha\}$, where $\theta_{TA}$ represents a parameter of the task abstraction network, $\theta_{policy}$ represents a parameter of the shared policy network, and $\alpha$ represents the target learning rate, $$r_t(\theta) = \frac{\pi_\theta(a_t \mid s_t)}{\pi_{\theta_{old}}(a_t \mid s_t)},$$

where $\pi_\theta(a_t|s_t)$ represents a probability that, after $\theta$ is updated, an input of the shared policy network is a status vector $s_t$, and an output is a driving operation $a_t$, $\pi_{\theta_{old}}(a_t|s_t)$ represents a probability that, before $\theta$ is updated, an input of the shared policy network is the status vector $s_t$, and an output is the driving operation $a_t$, $$A_t = \sum_{t'=t}^{H} r_{t'} - b(s_t),$$

where H is a maximum quantity of steps, $b(s_t)$ represents a reference function used to calculate a return obtained by the self-driving apparatus at a time step t, and $r_t$, represents a real return obtained by the self-driving apparatus at the time step t, clip $(r_t(\theta), 1-\varepsilon, 1+\varepsilon, r_t(\theta))$ represents that a minimum value of $r_t(\theta)$ is $1-\varepsilon$, a maximum value of $r_t(\theta)$ is $1+\varepsilon$, and $\varepsilon$ is a constant term greater than 0, $KL[\pi_{\theta_{old}},\pi_\theta]]$ represents relative entropy of two probability distributions obtained before and after $\theta$ is updated, and $\beta$ is a hyperparameter, and $E_t[\ ]$ represents calculating an expectation in a bracket.

In an optional implementation, the task feature vector is an H-dimensional vector, the status vector is a G-dimensional vector, and a value obtained by dividing G by H is greater than a target threshold.

According to a second aspect, an embodiment of this application provides a training method. The method includes obtaining F batches of historical paths corresponding to F self-driving tasks, where the F batches of historical paths one-to-one correspond to the F self-driving tasks, any one of the F batches of historical paths includes at least one group of historical paths, and F is an integer greater than 1, updating parameters of a task abstraction network based on F losses corresponding to the F self-driving tasks, where the task abstraction network is configured to determine, based on a historical path of any one of the F self-driving tasks, a task feature vector representing features of the any task, and the F losses one-to-one correspond to the F self-driving tasks, and updating parameters of a shared policy network based on the F losses, where the shared policy network is configured to determine, based on a status vector and a task feature vector extracted by the task abstraction network, a driving operation that needs to be performed by the self-driving apparatus, and the status vector is configured to represent a driving status of the self-driving apparatus.

A loss corresponding to one self-driving task may be a sum of losses of a batch of historical paths corresponding to the self-driving task, or an average of all groups of historical paths included in a batch of path losses.

In this embodiment of this application, the parameters of the task abstraction network and the parameters of the shared policy network are updated based on losses of all tasks, so that the task abstraction network and the shared policy network can process each task efficiently.

In an optional implementation, the obtaining F batches of historical paths corresponding to F self-driving tasks includes inputting a reference feature vector and a first status vector to the shared policy network for processing, to obtain a first driving operation, where the reference feature vector is a zero vector or a task feature vector that is of the any task and that is determined based on N groups of historical paths of the any task, the first status vector is configured to represent a driving status of the self-driving apparatus at a first time step, and N is an integer greater than 0, obtaining a driving status of the self-driving apparatus at a second time step and a return for performing the first driving operation, where the second time step is a next time step of the first time step, and the driving status of the self-driving apparatus at the second time step is a driving status reached after the self-driving apparatus performs the first driving operation at the first time step, and determining a group of historical paths of the any task based on information about T time steps for completing or executing the any task by the self-driving apparatus, where the T time steps include the first time step, information about any one of the T time steps includes a driving status of the self-driving apparatus at the any time step, a driving operation performed by the self-driving apparatus at the any time step, and a return obtained by the self-driving apparatus at the any time step, and T is an integer not less than 1.

In an optional implementation, before the inputting a reference feature vector and a first status vector to the shared policy network for processing, to obtain a first driving operation, the method further includes obtaining the N groups of historical paths, updating, based on N losses corresponding to the N groups of historical paths, a group of task abstraction network parameters corresponding to the self-driving task, where the N losses one-to-one correspond to the N groups of historical paths, using the task abstraction network to process the N groups of historical paths by using updated group of task abstraction network parameters, to obtain N intermediate feature vectors, where the N intermediate feature vectors one-to-one correspond to the N groups of historical paths, and determining the reference feature vector based on the N intermediate feature vectors.

In an optional implementation, the updating, based on N losses corresponding to the N groups of historical paths, a group of task abstraction network parameters corresponding to the self-driving task includes updating a group of relative parameters of the task abstraction network with respect to the self-driving task by using gradient values of a first loss function relative to the parameters of the task abstraction network, where the group of task abstraction network parameters are differences between the parameters of the task abstraction network and the group of relative parameters, and the first loss function is configured to calculate a sum of the N losses.

In an optional implementation, a calculation formula of the first loss function is as follows:

$$L(\theta_{TA}) = E_\tau\Big[\sum_{t=0}^{H}\Big(\log\pi_{\theta_{policy}}(a_t \mid s_t, h(\theta_{TA}))\Big(\sum_{t'=t}^{H} r_{t'} - b(s_t)\Big)\Big)\Big].$$

$\theta_{TA}$ represents a parameter of the task abstraction network, $\pi_{\theta_{policy}}(a_t|s_t, h(\theta_{TA}))$ represents a probability that an input of the shared policy network is a status vector $s_t$ and a feature vector $h(\theta_{TA})$, and an output is a driving operation $a_t$, H is a maximum quantity of steps, and t represents a time step, $b(s_t)$ represents a reference function used to calculate a return obtained by the self-driving apparatus at the time step t, $r_t$, represents a real return obtained by the self-driving apparatus at the time step t, and $E_\tau[\ ]$ represents calculating an expectation in a bracket.

In an optional implementation, the updating parameters of a task abstraction network based on F losses corresponding to the F self-driving tasks includes updating the parameters of the task abstraction network by using gradient values of a second loss function relative to the parameters of the task abstraction network, where the second loss function is configured to calculate a sum of the F losses of the F self-driving tasks or a mean of the F losses, the F losses one-to-one correspond to the F self-driving tasks, and a loss of any one of the F self-driving tasks is obtained through calculation based on a latest batch of historical paths of the any task.

In an optional implementation, the updating parameters of a shared policy network based on the F losses includes updating the parameters of the shared policy network by using gradient values of the second loss function relative to the parameters of the shared policy network.

In an optional implementation, the method further includes updating a target learning rate by using gradient values of the second loss function relative to the target learning rate, where the target learning rate is a learning rate used to update relative parameters of the task abstraction network with respect to the any task.

In an optional implementation, a calculation formula of the second loss function is as follows:

$$L(\theta)=E_t[\min\{r_t(\theta)A_t,\mathrm{clip}(r_t(\theta),1-\varepsilon,1+\varepsilon,r_t(\theta))A_t\}-\beta KL[\pi_{\theta_{old}},\pi_\theta]].$$

$\theta=\{\theta_{TA}, \theta_{policy}, \alpha\}$, where $\theta_{TA}$ represents a parameter of the task abstraction network, $\theta_{policy}$ represents a parameter of the shared policy network, and $\alpha$ represents the target learning rate, $$r_t(\theta) = \frac{\pi_\theta(a_t \mid s_t)}{\pi_{\theta_{old}}(a_t \mid s_t)},$$

where $\pi_\theta(a_t|s_t)$ represents a probability that, after $\theta$ is updated, an input of the shared policy network is a status vector $s_t$, and an output is a driving operation $a_t$, $\pi_{\theta_{old}}(a_t|s_t)$ represents a probability that, before $\theta$ is updated, an input of the shared policy network is the status vector $s_t$, and an output is the driving operation $a_t$, $$A_t = \sum_{t'=t}^{H} r_{t'} - b(s_t),$$

where H is a maximum quantity of steps, $b(s_t)$ represents a reference function used to calculate a return obtained by the self-driving apparatus at a time step t, and $r_t$ represents a real return obtained by the self-driving apparatus at the time step t, clip $(r_t(\theta), 1-\varepsilon, 1+\varepsilon, r_t(\theta))$ represents that a minimum value of $r_t(\theta)$ is $1-\varepsilon$, a maximum value of $r_t(\theta)$ is $1+\varepsilon$, and $\varepsilon$ is a constant term greater than 0, $KL[\pi_{\theta_{old}}, \pi_\theta]$ represents relative entropy of two probability distributions obtained before and after $\theta$ is updated, and $\beta$ is a hyperparameter, and $E_t[\ ]$ represents calculating an expectation in a bracket.

In an optional implementation, the task feature vector is an H-dimensional vector, the status vector is a G-dimensional vector, and a value obtained by dividing G by H is greater than a target threshold.

According to a third aspect, an embodiment of this application provides another self-driving method. The method includes the following steps.

A self-driving apparatus receives a self-driving task. The self-driving apparatus sends driving information to a cloud server through a transceiver. The self-driving apparatus receives a control instruction from the cloud server. The self-driving apparatus performs a target driving operation indicated by the control instruction.

A process in which the cloud server determines the control instruction is as follows. The cloud server determines, based on the driving information, a current self-driving task of the self-driving apparatus and a status vector representing a driving status of the self-driving apparatus. The cloud server determines a task feature vector of the self-driving task based on M groups of historical paths of the self-driving task. The cloud server determines, based on the task feature vector and the status vector, the target driving operation that needs to be performed by the self-driving apparatus, and determines the control instruction corresponding to the target driving operation.

In this embodiment of this application, the self-driving apparatus is controlled by the cloud server to implement the self-driving operation, provided that the self-driving apparatus sends the driving information to the cloud server. Therefore, workload is comparatively small. In addition, because the cloud server obtains more information than the self-driving apparatus and has a stronger processing capability, the self-driving apparatus can be controlled by the cloud server to complete a self-driving task of the self-driving apparatus more safely and properly.

According to a fourth aspect, an embodiment of this application provides another self-driving method. The method includes the following steps.

The cloud server receives driving information of a self-driving apparatus. The cloud server determines, based on the driving information, a current self-driving task of the self-driving apparatus and a status vector representing a driving status of the self-driving apparatus. The cloud server determines a task feature vector of the self-driving task based on M groups of historical paths of the self-driving task. The cloud server determines, based on the task feature vector and the status vector, the target driving operation that needs to be performed by the self-driving apparatus. The cloud server sends a control instruction to the self-driving apparatus. The control instruction is configured to instruct the self-driving apparatus to perform the target driving operation.

In this embodiment of this application, the cloud server has a processing capability and a data storage capability that are unmatchable for the self-driving apparatus. The cloud server may fully use a processing resource and a storage resource of the cloud server to provide a self-driving service for each self-driving apparatus. In addition, the self-driving apparatus does not need to determine, by itself, a driving operation that needs to be executed, therefore workload is comparatively small.

In an optional implementation, that the cloud server determines a task feature vector of the self-driving task based on M groups of historical paths of the self-driving task includes the following steps.

The cloud server obtains the M groups of historical paths. The cloud server performs feature extraction on the M groups of historical paths by using a task abstraction network, to obtain M groups of intermediate feature vectors. The M groups of intermediate feature vectors one-to-one correspond to the M groups of historical paths.

The cloud server determines the task feature vector based on the M groups of intermediate feature vectors.

In an optional implementation, that the cloud server determines, based on the task feature vector and the status vector, the target driving operation that needs to be performed by the self-driving apparatus includes the following step.

The cloud server processes the task feature vector and the status vector by using a shared policy network, to obtain the target driving operation. The shared policy network is a neural network configured to implement reinforcement learning.

In an optional implementation, that the cloud server obtains any one of the M groups of historical paths includes the following steps.

The cloud server processes a reference feature vector and a first status vector by using the shared policy network, to obtain a first driving operation. The reference feature vector is a zero vector or a feature vector that is of the self-driving task and that is determined based on N groups of historical paths of the self-driving task. The first status vector is configured to represent a driving status of the self-driving apparatus at a first time step. N is an integer greater than 0.

The cloud server indicates the self-driving apparatus to perform the first driving operation at the first time step.

The cloud server obtains a driving status of the self-driving apparatus at a second time step and a return for performing the first driving operation. The second time step is a next time step of the first time step.

The cloud server determines a group of historical paths based on information about T time steps at which the self-driving apparatus completes or executes the self-driving task. The T time steps include the first time step, information about any one of the T time steps includes a driving status of the self-driving apparatus at the any time step, a driving operation performed by the self-driving apparatus at the any time step, and a return obtained by the self-driving apparatus at the any time step, and Tis an integer not less than 1.

In an optional implementation, before the cloud server processes the reference feature vector and the first status vector by using the shared policy network, to obtain the first driving operation, the method further includes the following steps.

The cloud server obtains the N groups of historical paths.

The cloud server updates, based on N losses corresponding to the N groups of historical paths, a group of task abstraction network parameters corresponding to the self-driving task. The N losses one-to-one correspond to the N groups of historical paths.

The cloud server performs feature extraction on the N groups of historical paths by using the task abstraction network, to obtain N intermediate feature vectors. The N intermediate feature vectors one-to-one correspond to the N groups of historical paths, and the task abstraction network processes the N groups of historical paths by using the group of task abstraction network parameters.

The cloud server determines the reference feature vector based on the N intermediate feature vectors.

In an optional implementation, that the cloud server updates, based on N losses corresponding to the N groups of historical paths, a group of task abstraction network parameters corresponding to the self-driving task includes the following step.

The cloud server updates, by using gradient values of a first loss function relative to parameters of the task abstraction network, a group of relative parameters of the task abstraction network with respect to the self-driving task. The group of task abstraction network parameters are differences between the parameters of the task abstraction network and the group of relative parameters, and the first loss function is configured to calculate a sum of the N losses.

In an optional implementation, a calculation formula of the first loss function is as follows:

10

$$L(\theta_{TA}) = E_\tau\Big[\sum_{t=0}^{H}\Big(\log\pi_{\theta_{policy}}(a_t \mid s_t, h(\theta_{TA}))\Big(\sum_{t'=t}^{H} r_{t'} - b(s_t)\Big)\Big)\Big].$$

$\theta_{TA}$ represents a parameter of the task abstraction network, $\pi_{\theta_{policy}}(a_t|s_t, h(\theta_{TA}))$ represents a probability that an input of the shared policy network is a status vector $s_t$ and a feature vector $h(\theta_{TA})$, and an output is a driving operation $a_t$, H is a maximum quantity of steps, and t represents a time step, $b(s_t)$ represents a reference function used to calculate a return obtained by the self-driving apparatus at the time step t, $r_t$ represents a real return obtained by the self-driving apparatus at the time step t, and $E_\tau[$ ] represents calculating an expectation in a bracket.

In an optional implementation, the method further includes the following steps.

The cloud server updates parameters of the task abstraction network by using gradient values of a second loss function relative to the parameters of the task abstraction network. The second loss function is configured to calculate a sum of F losses of F self-driving tasks or a mean of the F losses, the F losses one-to-one correspond to the F self-driving tasks, a loss of any one of the F self-driving tasks is obtained through calculation based on a latest batch of historical paths of the any task, and F is an integer greater than 1.

The cloud server updates parameters of the shared policy network by using gradient values of the second loss function relative to the parameters of the shared policy network.

In an optional implementation, the method further includes the following step.

The cloud server updates a target learning rate by using gradient values of the second loss function relative to the target learning rate. The target learning rate is a learning rate for updating the group of task abstraction network parameters of the task abstraction network with respect to the self-driving task.

In an optional implementation, a calculation formula of the second loss function is as follows:

$$L(\theta)=E_t[\min\{r_t(\theta)A_t, clip(r_t(\theta), 1-\varepsilon, 1+\varepsilon, r_t(\theta))A_t\}-\beta KL[\pi_{\theta_{old}}, \pi_\theta]].$$

$\theta=\{\theta_{TA}, \theta_{policy}, \alpha\}$, where $\theta_{TA}$ represents a parameter of the task abstraction network, $\theta_{policy}$ represents a parameter of the shared policy network, and $\alpha$ represents the target learning rate, $$r_t(\theta) = \frac{\pi_\theta(a_t \mid s_t)}{\pi_{\theta_{old}}(a_t \mid s_t)},$$

where $\pi_\theta(a_t|s_t)$ represents a probability that, after $\theta$ is updated, an input of the shared policy network is a status vector $s_t$, and an output is a driving operation $a_t$, $\pi_{\theta_{old}}(a_t|s_t)$ represents a probability that, before $\theta$ is updated, an input of the shared policy network is the status vector $s_t$, and an output is the driving operation $a_t$, $$A_t = \sum_{t'=t}^{H} r_{t'} - b(s_t),$$

where H is a maximum quantity of steps, $b(s_t)$ represents a reference function used to calculate a return obtained by the self-driving apparatus at a time step t, and $r_t$ represents a real return obtained by the self-driving apparatus at the time step t, clip $(r_t(\theta), 1-\varepsilon, 1+\varepsilon, r_t(\theta))$ represents that a minimum value

11 of $r_t(\theta)$ is $1-\varepsilon$, a maximum value of $r_t(\theta)$ is $1+\varepsilon$, and $\varepsilon$ is a constant term greater than 0, $KL[\pi_{\theta_{old}}, \pi_{\theta}]]$ represents relative entropy of two probability distributions obtained before and after $\theta$ is updated, and $\beta$ is a hyperparameter, and $E_t[\ ]$ represents calculating an expectation in a bracket.

In an optional implementation, the task feature vector is an H-dimensional vector, the status vector is a G-dimensional vector, and a value obtained by dividing G by H is greater than a target threshold.

According to a fifth aspect, an embodiment of this application provides a self-driving apparatus. The self-driving apparatus includes a processor, configured to determine a task feature vector of a self-driving task based on M groups of historical paths of the self-driving task, where the task feature vector is a vector representing features of the self-driving task, and M is an integer greater than 0, where the processor is further configured to determine, based on the task feature vector and a status vector, a target driving operation that needs to be performed, where the status vector is configured to represent a driving status of the self-driving apparatus, and a control system, configured to control the self-driving apparatus to perform the target driving operation.

In this embodiment of this application, the self-driving apparatus determines the task feature vector of the self-driving task by using the historical path of the self-driving task, and further formulates a targeted driving policy based on the task feature vector. In this way, an existing historical path can be effectively used to formulate a better driving policy.

In an optional implementation, the processor is further configured to obtain the M groups of historical paths, perform feature extraction on the M groups of historical paths by using a task abstraction network, to obtain M groups of intermediate feature vectors, where the M groups of intermediate feature vectors one-to-one correspond to the M groups of historical paths, and determine the task feature vector based on the M groups of intermediate feature vectors.

In an optional implementation, the processor is further configured to process the task feature vector and the status vector by using a shared policy network, to obtain the target driving operation. The shared policy network is a neural network configured to implement reinforcement learning.

In an optional implementation, the processor is further configured to process a reference feature vector and a first status vector by using the shared policy network, to obtain a first driving operation. The reference feature vector is a zero vector or a feature vector that is of the self-driving task and that is determined based on N groups of historical paths of the self-driving task. The first status vector is configured to represent a driving status of the self-driving apparatus at a first time step. N is an integer greater than 0.

The control system is further configured to control the self-driving apparatus to perform the first driving operation at the first time step.

The processor is further configured to obtain a driving status of the self-driving apparatus at a second time step and a return for performing the first driving operation, where the second time step is a next time step of the first time step, and determine a group of historical paths based on information about T time steps for completing or executing the self-driving task. The T time steps include the first time step, information about any one of the T time steps includes a driving status of the self-driving apparatus at the any time step, a driving operation performed by the self-driving apparatus at the any time step, and a return obtained by the self-driving apparatus at the any time step, and T is an integer not less than 1.

In an optional implementation, the processor is further configured to obtain the N groups of historical paths, update, based on N losses corresponding to the N groups of historical paths, a group of task abstraction network parameters corresponding to the self-driving task, where the N losses one-to-one correspond to the N groups of historical paths, perform feature extraction on the N groups of historical paths by using the task abstraction network, to obtain N intermediate feature vectors, where the N intermediate feature vectors one-to-one correspond to the N groups of historical paths, and the task abstraction network processes the N groups of historical paths by using the group of task abstraction network parameters, and determine the reference feature vector based on the N intermediate feature vectors.

In an optional implementation, the processor is configured to update a group of relative parameters of the task abstraction network with respect to the self-driving task by using gradient values of a first loss function relative to parameters of the task abstraction network. The group of task abstraction network parameters are differences between the parameters of the task abstraction network and the group of relative parameters, and the first loss function is configured to calculate a sum of the N losses.

In an optional implementation, a calculation formula of the first loss function is as follows:

$$L(\theta_{TA}) = E_\tau\left[\sum\nolimits_{t=0}^{H}\left(\log \pi_{\theta_{policy}}(a_t \mid s_t, h(\theta_{TA}))\left(\sum\nolimits_{t'=t}^{H} r_{t'} - b(s_t)\right)\right)\right].$$

$\theta_{TA}$ represents a parameter of the task abstraction network, $\pi_{\theta_{policy}}(a_t|s_t, h(\theta_{TA}))$ represents a probability that an input of the shared policy network is a status vector $s_t$ and a feature vector $h(\theta_{TA})$, and an output is a driving operation $a_t$, H is a maximum quantity of steps, and t represents a time step, $b(s_t)$ represents a reference function used to calculate a return obtained by the self-driving apparatus at the time step t, $r_t$, represents a real return obtained by the self-driving apparatus at the time step t, and $E_\tau[\ ]$ represents calculating an expectation in a bracket.

In an optional implementation, the processor is further configured to update parameters of the task abstraction network by using gradient values of a second loss function relative to the parameters of the task abstraction network, where the second loss function is configured to calculate a sum of F losses of F self-driving tasks or a mean of the F losses, the F losses one-to-one correspond to the F self-driving tasks, a loss of any one of the F self-driving tasks is obtained through calculation based on a latest batch of historical paths of the any task, and F is an integer greater than 1, and update parameters of the shared policy network by using gradient values of the second loss function relative to the parameters of the shared policy network.

In an optional implementation, the processor is further configured to update a target learning rate by using gradient values of the second loss function relative to the target learning rate. The target learning rate is a learning rate for updating the group of task abstraction network parameters of the task abstraction network with respect to the self-driving task.

In an optional implementation, a calculation formula of the second loss function is as follows:

$$L(\theta) = E_t[\min\{r_t(\theta)A_t, \mathrm{clip}(r_t(\theta), 1-\varepsilon, 1+\varepsilon, r_t(\theta))A_t\} - \beta KL[\pi_{\theta_{old}}, \pi_\theta]].$$

$\theta = \{\theta_{TA}, \theta_{policy}, \alpha\}$, where $\theta_{TA}$ represents a parameter of the task abstraction network, $\theta_{policy}$ represents a parameter of the shared policy network, and $\alpha$ represents the target learning rate, $$r_t(\theta) = \frac{\pi_\theta(a_t \mid s_t)}{\pi_{\theta_{old}}(a_t \mid s_t)},$$

where $\pi_\theta(a_t|s_t)$ represents a probability that, after $\theta$ is updated, an input of the shared policy network is a status vector $s_t$, and an output is a driving operation $a_t$, $\pi_{\theta_{old}}(a_t|s_t)$ represents a probability that, before $\theta$ is updated, an input of the shared policy network is the status vector $s_t$, and an output is the driving operation $a_t$, $$A_t = \sum_{t'=t}^{H} r_{t'} - b(s_t),$$

where H is a maximum quantity of steps, $b(s_t)$ represents a reference function used to calculate a return obtained by the self-driving apparatus at a time step t, and $r_t$ represents a real return obtained by the self-driving apparatus at the time step t, clip $(r_t(\theta), 1-\varepsilon, 1+\varepsilon, r_t(\theta))$ represents that a minimum value of $r_t(\theta)$ is $1-\varepsilon$, a maximum value of $r_t(\theta)$ is $1+\varepsilon$, and $\varepsilon$ is a constant term greater than 0, $KL[\pi_{\theta_{old}}, \pi_\theta]]$ represents relative entropy of two probability distributions obtained before and after $\theta$ is updated, and $\beta$ is a hyperparameter, and $E_t[$ ] represents calculating an expectation in a bracket.

In an optional implementation, the task feature vector is an H-dimensional vector, the status vector is a G-dimensional vector, and a value obtained by dividing G by H is greater than a target threshold.

According to a sixth aspect, an embodiment of this application provides a training device. The training device includes an obtaining unit, configured to obtain F batches of historical paths corresponding to F self-driving tasks, where the F batches of historical paths one-to-one correspond to the F self-driving tasks, any one of the F batches of historical paths includes at least one group of historical paths, and F is an integer greater than 1, and a processor, configured to update parameters of a task abstraction network based on F losses corresponding to the F self-driving tasks, where the task abstraction network is configured to determine, based on a historical path of any one of the F self-driving tasks, a task feature vector representing features of the any task, and the F losses one-to-one correspond to the F self-driving tasks.

The processor is further configured to update parameters of a shared policy network based on the F losses. The shared policy network is configured to determine, based on a status vector and a task feature vector extracted by the task abstraction network, a driving operation that needs to be performed by the self-driving apparatus, and the status vector is configured to represent a driving status of the self-driving apparatus.

The training device may be a self-driving apparatus, a cloud server, or another device.

In this embodiment of this application, the parameters of the task abstraction network and the parameters of the shared policy network are updated based on losses of all tasks, so that the task abstraction network and the shared policy network can process each task efficiently.

In an optional implementation, the processor is further configured to input a reference feature vector and a first status vector to the shared policy network for processing, to obtain a first driving operation. The reference feature vector is a zero vector or a task feature vector that is of the any task and that is determined based on N groups of historical paths of the any task, the first status vector is configured to represent a driving status of the self-driving apparatus at a first time step, and N is an integer greater than 0.

The obtaining unit is further configured to obtain a driving status of the self-driving apparatus at a second time step and a return for performing the first driving operation. The second time step is a next time step of the first time step, and the driving status of the self-driving apparatus at the second time step is a driving status reached after the self-driving apparatus performs the first driving operation at the first time step.

The processor is further configured to determine a group of historical paths of the any task based on information about T time steps for completing or executing the any task by the self-driving apparatus, where the T time steps include the first time step, information about any one of the T time steps includes a driving status of the self-driving apparatus at the any time step, a driving operation performed by the self-driving apparatus at the any time step, and a return obtained by the self-driving apparatus at the any time step, and T is an integer not less than 1.

In an optional implementation, the obtaining unit is further configured to obtain the N groups of historical paths.

The processor is further configured to update, based on N losses corresponding to the N groups of historical paths, a group of task abstraction network parameters corresponding to the self-driving task. The N losses one-to-one correspond to the N groups of historical paths.

The processor is further configured to use the task abstraction network to process the N groups of historical paths by using updated group of task abstraction network parameters, to obtain N intermediate feature vectors, where the N intermediate feature vectors one-to-one correspond to the N groups of historical paths, and determine the reference feature vector based on the N intermediate feature vectors.

In an optional implementation, the processor is configured to update a group of relative parameters of the task abstraction network with respect to the self-driving task by using gradient values of a first loss function relative to the parameters of the task abstraction network. The group of task abstraction network parameters are differences between the parameters of the task abstraction network and the group of relative parameters, and the first loss function is configured to calculate a sum of the N losses.

In an optional implementation, a calculation formula of the first loss function is as follows:

$$L(\theta_{TA}) = E_\tau \left[ \sum_{t=0}^{H} \left( \log \pi_{\theta_{policy}}(a_t \mid s_t, h(\theta_{TA})) \left( \sum_{t'=t}^{H} r_{t'} - b(s_t) \right) \right) \right].$$

$\theta_{TA}$ represents a parameter of the task abstraction network, $\pi_{\theta_{policy}}(a_t|s_t, h(\theta_{TA}))$ represents a probability that an input of the shared policy network is a status vector $s_t$ and a feature vector $h(\theta_{TA})$, and an output is a driving operation $a_t$, H is a maximum quantity of steps, and t represents a time step, $b(s_t)$ represents a reference function used to calculate a return obtained by the self-driving apparatus at the time step t, $r_t$ represents a real return obtained by the self-driving apparatus at the time step t, and $E_\tau[$ ] represents calculating an expectation in a bracket.

In an optional implementation, the processor is configured to update the parameters of the task abstraction network by using gradient values of a second loss function relative to the parameters of the task abstraction network. The second loss function is configured to calculate a sum of the F losses of the F self-driving tasks or a mean of the F losses, the F losses one-to-one correspond to the F self-driving tasks, and a loss of any one of the F self-driving tasks is obtained through calculation based on a latest batch of historical paths of the any task.

In an optional implementation, the processor is configured to update the parameters of the shared policy network by using gradient values of the second loss function relative to the parameters of the shared policy network.

In an optional implementation, the processor is further configured to update the target learning rate by using the gradient values of the second loss function relative to the target learning rate. The target learning rate is a learning rate for updating the relative parameters of the task abstraction network with respect to the any task.

In an optional implementation, a calculation formula of the second loss function is as follows:

$$L(\theta)=E_t[\min\{r_t(\theta)A_t,\mathrm{clip}(r_t(\theta),1-\varepsilon,1+\varepsilon,r_t(\theta))A_t\}-\beta KL$$
$$[\pi_{\theta_{old}},\pi_\theta]].$$

$\theta=\{\theta_{TA}, \theta_{policy}, \alpha\}$, where $\theta_{TA}$ represents a parameter of the task abstraction network, $\theta_{policy}$ represents a parameter of the shared policy network, and $\alpha$ represents the target learning rate, $$r_t(\theta) = \frac{\pi_\theta(a_t \mid s_t)}{\pi_{\theta_{old}}(a_t \mid s_t)},$$

where $\pi_\theta(a_t|s_t)$ represents a probability that, after $\theta$ is updated, an input of the shared policy network is a status vector $s_t$, and an output is a driving operation $a_t$, $\pi_{\theta_{old}}(a_t|s_t)$ represents a probability that, before $\theta$ is updated, an input of the shared policy network is the status vector $s_t$, and an output is the driving operation $a_t$, $$A_t = \sum_{t'=t}^H r_{t'} - b(s_t),$$

where H is a maximum quantity of steps, $b(s_t)$ represents a reference function used to calculate a return obtained by the self-driving apparatus at a time step t, and $r_t$ represents a real return obtained by the self-driving apparatus at the time step t, clip $(r_t(\theta), 1-\varepsilon, 1+\varepsilon, r_t(\theta))$ represents that a minimum value of $r_t(\theta)$ is $1-\varepsilon$, a maximum value of $r_t(\theta)$ is $1+\varepsilon$, and $\varepsilon$ is a constant term greater than 0, $KL[\pi_{\theta_{old}}, \pi_\theta]]$ represents relative entropy of two probability distributions obtained before and after $\theta$ is updated, and $\beta$ is a hyperparameter, and $E_t[\ ]$ represents calculating an expectation in a bracket.

In an optional implementation, the task feature vector is an H-dimensional vector, the status vector is a G-dimensional vector, and a value obtained by dividing G by H is greater than a target threshold.

According to a seventh aspect, an embodiment of this application provides another self-driving apparatus. The self-driving apparatus includes an input device, configured to receive a self-driving task, a transceiver, configured to send driving information to a cloud server, and receive a control instruction from the cloud server, and a control system, configured to control the self-driving apparatus to perform a target driving operation indicated by the control instruction.

According to an eighth aspect, an embodiment of this application provides a cloud server. The cloud server includes a transceiver, configured to receive driving information from a self-driving apparatus, and a processor, configured to determine, based on the driving information, a current self-driving task of the self-driving apparatus and a status vector representing a driving status of the self-driving apparatus, determine a task feature vector of the self-driving task based on M groups of historical paths of the self-driving task, and determine, based on the task feature vector and the status vector, the target driving operation that needs to be executed by the self-driving apparatus.

The transceiver is further configured to send a control instruction to the self-driving apparatus. The control instruction is configured to indicate the self-driving apparatus to perform the target driving operation.

According to a ninth aspect, an embodiment of this application provides a computer-readable storage medium. The computer storage medium includes a computer program. The computer program includes a program instruction. When the program instruction is executed by a processor, the processor is enabled to perform the method in any one of the first aspect to the fourth aspect, and the optional implementations.

According to a tenth aspect, an embodiment of this application provides a computer program product. The computer program product includes a program instruction. When the program instruction is executed by a processor, the processor is enabled to perform the method according to any one of the first aspect to the fourth aspect, and the optional implementations.

According to an eleventh aspect, an embodiment of this application provides a self-driving apparatus, including a memory and a processor. The memory is configured to store a program instruction, and the processor is configured to execute the program instruction, to perform the method in any one of the first aspect to the third aspect, and the optional implementations.

According to a twelfth aspect, an embodiment of this application provides a cloud server, including a memory and a processor. The memory is configured to store a program instruction, and the processor is configured to execute the program instruction, to perform the method in any one of the fourth aspect or the optional implementations.

BRIEF DESCRIPTION OF THE DRAWINGS

FIG. 4 is a schematic flowchart of a self-driving method according to an embodiment of this application;

DETAILED DESCRIPTION OF ILLUSTRATIVE EMBODIMENTS

To make a person skilled in the art understand the technical solutions in the embodiments of this application better, the following clearly describes the technical solutions in the embodiments of this application with reference to the accompanying drawings in the embodiments of this application. It is clear that the described embodiments are merely some but not all of the embodiments of this application.

In the embodiments, claims, and accompanying drawings of the specification of this application, terms such as "first", "second", and "third" are intended to distinguish between similar objects but do not necessarily indicate a specific order or sequence. In addition, terms "include", "comprise", and any other variant thereof are intended to cover a non-exclusive inclusion, for example, include a series of steps or units. A method, system, product, or device is not necessarily limited to those steps or units that are clearly listed, but may include other steps or units that are not clearly listed or inherent to such a process, method, product, or device.

Figure 1:
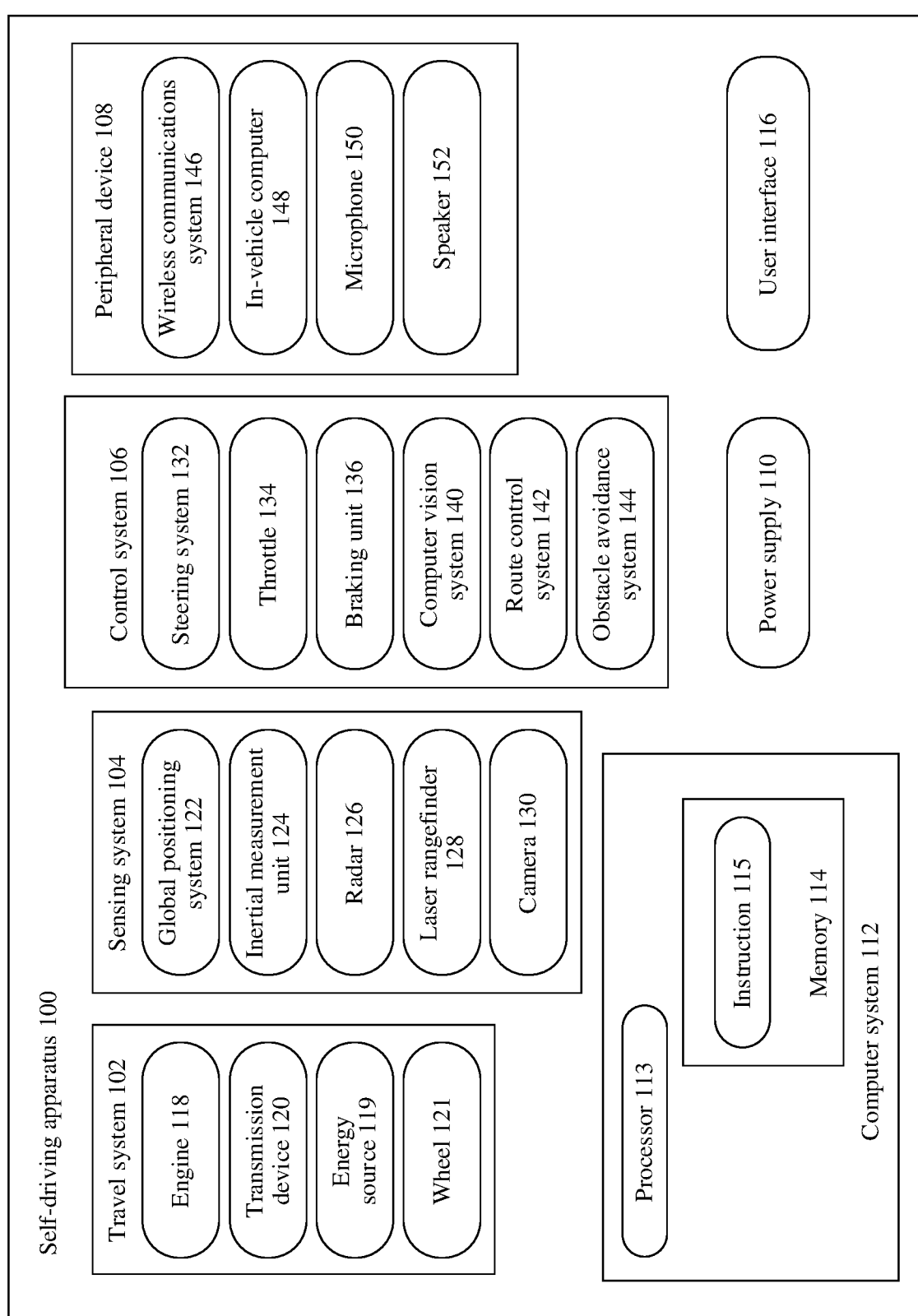
FIG. 1 is a functional block diagram of a self-driving apparatus 100 according to an embodiment of this application.

FIG. 1 is a functional block diagram of a self-driving apparatus 100 according to an embodiment of this application. In an embodiment, the self-driving apparatus 100 is configured to be in a full or partial self-driving mode. For example, the self-driving apparatus 100 may control the self-driving apparatus 100 in a self-driving mode, determine a current status of the self-driving apparatus and a current status of an ambient environment of the self-driving apparatus through a manual operation, determine a possible action of at least one another vehicle in the ambient environment, determine a confidence level corresponding to a possibility of performing the possible behavior by the another vehicle, and control the self-driving apparatus 100 based on determined information. When the self-driving apparatus 100 is in the self-driving mode, the self-driving apparatus 100 may be set to operate without interacting with a person.

The self-driving apparatus 100 may include various subsystems, for example, a travel system 102, a sensor system 104, a control system 106, one or more peripheral devices 108, a power supply 110, a computer system 112, and a user interface 116. Optionally, the self-driving apparatus 100 may include more or fewer subsystems, and each subsystem may include a plurality of elements. In addition, the subsystems and the elements of the self-driving apparatus 100 may be all interconnected in a wired or wireless manner.

The travel system 102 may include components that power the self-driving apparatus 100. In an embodiment, the travel system 102 may include an engine 118, an energy source 119, a transmission device 120, and a wheel/tyre 121. The engine 118 may be an internal combustion engine, an electric motor, an air compression engine, or a combination of other types of engines, for example, a hybrid engine formed by a gasoline engine and an electric motor, or a hybrid engine formed by an internal combustion engine and an air compression engine. The engine 118 converts the energy source 119 into mechanical energy.

Examples of energy sources 119 include gasoline, diesel, other oil-based fuels, propane, other compressed-gas-based fuels, ethanol, solar panels, batteries, and other power sources. The energy source 119 may further provide energy for another system of the self-driving apparatus 100.

The transmission device 120 can transfer mechanical power from the engine 118 to the wheel 121. The transmission device 120 may include a gearbox, a differential, and a drive shaft. In an embodiment, the transmission device 120 may further include another device, for example, a clutch. The drive shaft may include one or more shafts that may be coupled to one or more wheels 121.

The sensor system 104 may include several sensors that sense information about the ambient environment of the self-driving apparatus 100. For example, the sensor system 104 may include a positioning system 122 (where the positioning system may be a global positioning system, a Beidou system, or another positioning system), an inertial measurement unit (IMU) 124, radar 126, a laser rangefinder 128, and a camera 130. The sensor system 104 may further include a sensor that monitors an internal system of the self-driving apparatus 100 (for example, an in-vehicle air quality monitor, a fuel gauge, or an oil temperature gauge). Sensor data from one or more of these sensors may be used to detect a direction, a speed, a steering angle, an acceleration, and the like of the self-driving apparatus 100. Detection and recognition are key functions for implementing a secure operation by the self-driving apparatus 100.

The positioning system 122 can be configured to estimate a geographical location of the self-driving apparatus 100. The IMU 124 is configured to sense a location and an orientation change of the self-driving apparatus 100 based on an inertial acceleration. In an embodiment, the IMU 124 may be a combination of an accelerometer and a gyroscope.

The radar 126 may sense an object in the ambient environment of the self-driving apparatus 100 by using a radio signal. In some embodiments, in addition to sensing an object, the radar 126 can be further configured to sense a speed and/or a moving direction of the object.

The laser rangefinder 128 can sense an object in the ambient environment of the self-driving apparatus 100 by using a laser. In some embodiments, the laser rangefinder 128 may include one or more laser sources, a laser scanner, one or more detectors, and other system components.

The camera 130 can be configured to capture a plurality of pictures of in the ambient environment of the self-driving apparatus 100. The camera 130 may be a static camera or a video camera.

The control system 106 controls operations of the self-driving apparatus 100 and components of the self-driving apparatus 100. The control system 106 may include various elements, including a steering system 132, a throttle 134, a braking unit 136, a sensor fusion algorithm, a computer vision system 140, a route control system 142, and an obstacle avoidance system 144.

The computer vision system 140 may operate to process and analyze a picture captured by the camera 130, so as to recognize objects and/or features in the ambient environment of the self-driving apparatus 100. The objects and/or features may include traffic signals, road boundaries, and obstacles. The computer vision system 140 may use an object recognition algorithm, a structure from motion (SFM) algorithm, video tracking, and another computer vision technology. In some embodiments, the computer vision system 140 may be configured to draw a map for an environment, track an object, estimate a speed of an object, and the like.

The route control system 142 is configured to determine a driving route of the self-driving apparatus 100. In some embodiments, the route control system 142 may determine the driving route for the self-driving apparatus 100 with reference to data from sensors, the GPS 122, and one or more predetermined maps.

The obstacle avoidance system 144 is configured to identify, evaluate, and avoid or otherwise bypass a potential obstacle in an environment of the self-driving apparatus 100.

Certainly, in an embodiment, the control system 106 may add components other than those shown and described, or may replace some of the components shown above. Alternatively, some of the components shown above may be removed.

The self-driving apparatus 100 interacts with an external sensor, another self-driving apparatus, another computer system, or a user through the peripheral device 108. The peripheral device 108 may include a wireless communications system 146, an in-vehicle computer 148, a microphone 150, and/or a speaker 152.

In some embodiments, the peripheral device 108 provides a means for a user of the self-driving apparatus 100 to interact with the user interface 116. For example, the in-vehicle computer 148 may provide information for the user of the self-driving apparatus 100. The user interface 116 may be further used to operate the in-vehicle computer 148 to receive user input. The in-vehicle computer 148 may perform an operation through a touchscreen. In other cases, the peripheral device 108 may provide a means used by the self-driving apparatus 100 to communicate with another device located in a vehicle. For example, the microphone 150 may receive audio (for example, a voice command or another audio input) from the user of the self-driving apparatus 100. Similarly, the speaker 152 may output audio to the user of the self-driving apparatus 100.

The wireless communications system 146 may perform wireless communication with one or more devices directly or by using a communications network. For example, the wireless communications system 146 may use 3G cellular communication such as CDMA, EVDo, or GSM/GPRS, use 4G cellular communication such as LTE, or use 5G cellular communication. In some embodiments, the wireless communications system 146 may communicate with a wireless local area network (WLAN) through Wi-Fi. In some embodiments, the wireless communications system 146 may directly communicate with another device by using an infrared link, Bluetooth, or ZigBee. For example, the wireless communications system 146 may include one or more dedicated short-range communications (DSRC) devices, and these devices may include a self-driving apparatus and/or public and/or private data communication apparatus between roadside stations.

The power supply 110 may supply power to the components of the self-driving apparatus 100. In an embodiment, the power supply 110 may be a rechargeable lithium-ion or lead-acid battery. One or more battery packs of such a battery may be configured as a power supply to supply power to the components of the self-driving apparatus 100. In some embodiments, the power supply 110 and the energy source 119 may be implemented together, as in some pure electric vehicles.

Some or all functions of the self-driving apparatus 100 are controlled by the computer system 112. The computer system 112 may include at least one processor 113. The processor 113 executes an instruction 115 stored in a non-transitory computer-readable medium such as a data storage apparatus 114. The computer system 112 may alternatively be a plurality of computing devices that control individual components or subsystems of the self-driving apparatus 100 in a distributed manner.

The processor 113 may be any conventional processor, for example, a commercially available CPU. Alternatively, the processor may be a dedicated device such as an ASIC or another hardware-based processor. Although FIG. 1 functionally shows the processor and a memory, a person of ordinary skill in the art should understand that the processor or the memory may actually include a plurality of processors or memories that are not stored in a same physical housing. For example, the memory may be a hard disk drive 133 or another storage medium located in a housing different from that of the computer system 112. Therefore, a reference to the processor is understood as a reference to a set of processors or memories that may or may not operate concurrently. Different from using a single processor to perform the steps described herein, some components such as a steering component and a deceleration component may each include a respective processor. The processor performs only computation related to component-specific functions.

In the aspects described herein, the processor may be located far away from the self-driving apparatus and perform wireless communication with the self-driving apparatus. In other aspects, some of the processes described herein are performed on the processor disposed inside the self-driving apparatus, while others are performed by a remote processor. The processes include necessary steps for performing a single operation.

In some embodiments, the data storage apparatus 114 may include instructions 115 (for example, program logic), and the instructions 115 may be executed by the processor 113 to implement various functions of the self-driving apparatus 100, including the functions described above. The data storage apparatus 114 may further include additional instructions or data, including instructions that are sent to, received from, or used to interact with and/or control one or more of the travel system 102, the sensor system 104, the control system 106, and the peripheral device 108.

In addition to the instructions 115, the data storage apparatus 114 may further store data, such as a road map, route information, and the location, the direction, the speed, and other information of the self-driving apparatus. Such information may be used by the self-driving apparatus 100 and the computer system 112 when the self-driving apparatus 100 operates in an autonomous mode, a semi-autonomous mode, and/or a manual mode. The data storage apparatus 114 may further include one or more groups of historical paths of at least one driving task. A group of historical paths may be expressed as $\tau = (s_0, a_0, r_0, s_1, a_1, r_1, \ldots, s_1, a_t, r_1)$, that is, a data set including two or more tuples in a form of $(s_t, a_t, r_1)$. Each tuple corresponds to one time step. $s_0$ is a driving status of the self-driving apparatus in the environment at a time step 0 (that is, a driving status reached when a task starts). $a_t$ is a driving operation performed by the self-driving apparatus at a time step t. $s_t$ is a driving status, reached after the self-driving apparatus performs the driving operation $a_{t-1}$, of the self-driving apparatus in the environment (that is, a driving status reached when the task ends). $r_t$ is a reward value (that is, a return obtained at the time step t) obtained by the self-driving apparatus by performing the driving operation $a_t$, and the value is calculated based on a reward function. The driving status $s_t$ is determined by the self-driving apparatus 100 based on information measured by the sensor system 104. The driving operation $a_t$ is an operation performed by a human driver or the self-driving apparatus. If the driving operation $a_t$ is performed by a driver, the self-driving apparatus detects the driving operation by using the sensor system 104.

The user interface 116 is configured to provide information for or receive information from the user of the self-driving apparatus 100. Optionally, the user interface 116 may include one or more input/output devices in a set of peripheral devices 108, for example, the wireless communications system 146, the in-vehicle computer 148, a microphone 150, and a speaker 152.

The computer system 112 may control functions of the self-driving apparatus 100 based on information received from various subsystems (for example, the travel system 102, the sensor system 104, and the control system 106) and the user interface 116. For example, the computer system 112 may use an input from a control system 106 to control a steering unit 132 to avoid obstacles detected by the sensor system 104 and the obstacle avoidance system 144. In some embodiments, the computer system 112 may provide control for the self-driving apparatus 100 and many aspects of the subsystems of the self-driving apparatus 100.

The computer system 112 is configured to determine a driving status of the self-driving apparatus 100 based on the sensor data collected by the sensor system 104, determine, based on the driving status and a current driving task, a driving operation that needs to be executed by the self-driving apparatus 100, and send, to the control system 106, a control instruction corresponding to the driving operation. The driving status of the self-driving apparatus 100 may include a driving situation of the self-driving apparatus 100, for example, a head direction, a speed, a location, and an acceleration, and may further include a status of the ambient environment of the self-driving apparatus 100, for example, a location of an obstacle, a location and a speed of another vehicle, a location of a pedestrian crosswalk, or a signal of a traffic light.

The control system 106 is configured to control the self-driving apparatus 100 to implement the driving operation corresponding to the control instruction. Specifically, the steering system 132 is configured to adjust a moving direction of the self-driving apparatus 100. For example, the steering system 132 is a steering wheel system. The throttle 134 is configured to control an operation speed of the engine 118 and further control the speed of the self-driving apparatus 100. The braking unit 136 is configured to control the self-driving apparatus 100 to decelerate. The braking unit 136 may use friction to slow down a rotational speed of the wheel 121. In another embodiment, the braking unit 136 may convert kinetic energy of the wheel 121 into a current. The braking unit 136 may alternatively use another method to reduce a rotational speed of the wheel 121, so as to control the speed of the self-driving apparatus 100.

Optionally, one or more of the foregoing components may be installed separately from or associated with the self-driving apparatus 100. For example, the data storage apparatus 114 may be partially or completely separated from the self-driving apparatus 100. The foregoing components may be communicatively coupled together in a wired and/or wireless manner.

Optionally, the foregoing components are merely examples. In actual application, components in the foregoing modules may be added or removed based on actual requirements. FIG. 1 should not be understood as a limitation to this embodiment of this application.

The self-driving apparatus 100 that is traveling on a road may recognize an object in the ambient environment of the self-driving apparatus 100, to determine to adjust a current speed. The object may be another self-driving apparatus, a traffic control device, or another type of object. In some examples, each recognized object may be considered independently, and a speed to be adjusted to by a self-driving car may be determined based on features of the object, such as a current speed of the object, an acceleration of the object, and a distance between the object and the self-driving apparatus.

Optionally, the self-driving apparatus 100 or a computing device (for example, the computer system 112, the computer vision system 140, and the data storage apparatus 114 in FIG. 1) associated with the self-driving apparatus 100 may predict an action of the recognized object based on features of the recognized object and a status of an ambient environment (for example, traffic, rain, or ice on a road). Optionally, each recognized object depends on an action of each other. Therefore, all recognized objects may be considered together to predict an action of a single recognized object. The self-driving apparatus 100 can adjust the speed of the self-driving apparatus 100 based on the predicted action of the recognized object. In other words, the self-driving car can determine, based on the predicted action of the object, a specific stable state (for example, acceleration, deceleration, or stop) to which the self-driving apparatus needs to be adjusted. In this process, another factor may also be considered to determine the speed of the self-driving apparatus 100, for example, a horizontal location of the self-driving apparatus 100 on a road on which the self-driving apparatus 100 travels, a curvature of the road, and a proximity between a static object and a dynamic object.

In addition to providing an instruction for adjusting the speed of the self-driving car, the computing device may further provide an instruction for modifying a steering angle of the self-driving apparatus 100, so that the self-driving car can follow a given track and/or maintain safe horizontal and vertical distances from objects (for example, a car on a neighboring lane of the road) near the self-driving car.

The foregoing self-driving apparatus 100 may be a car, a robot, a truck, a motorcycle, a bus, a boat, an airplane, a helicopter, a lawn mower, an entertainment vehicle, a playground self-driving apparatus, a construction device, a tram, a golf cart, a train, a trolley, or the like. This is not limited in this embodiment of this application.

Figure 2:
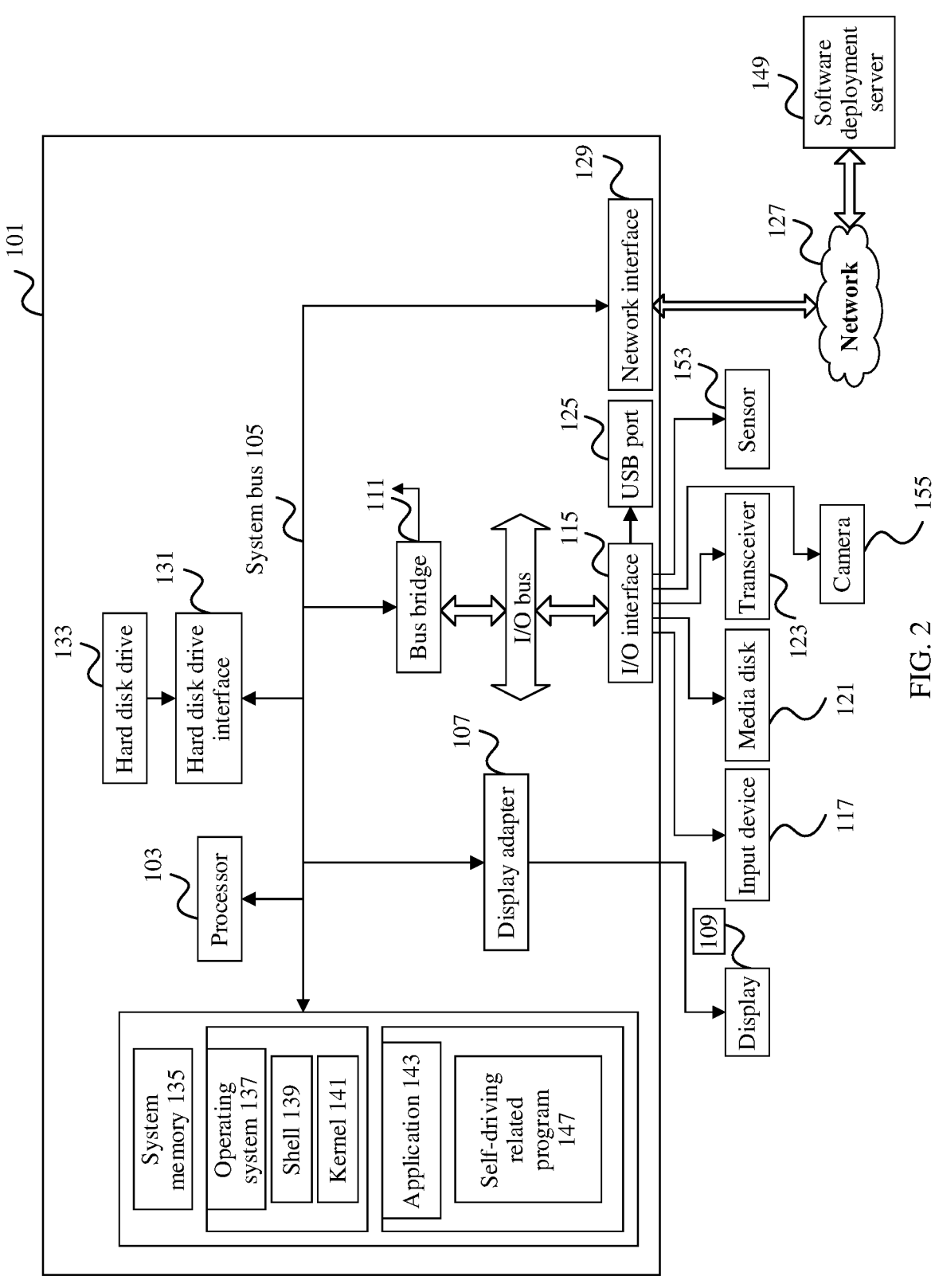
FIG. 2 is a schematic structural diagram of a self-driving system according to an embodiment of this application.

FIG. 1 is the functional block diagram of the self-driving apparatus 100. The following describes a self-driving system 101 in the self-driving apparatus 100. FIG. 2 is a schematic structural diagram of a self-driving system according to an embodiment of this application. FIG. 1 and FIG. 2 show the self-driving apparatus 100 from different perspectives. For example, the computer system 101 in FIG. 2 is the computer system 112 in FIG. 1. As shown in FIG. 2, the computer system 101 includes a processor 103, and the processor 103 is coupled to a system bus 105. The processor 103 may be one or more processors, and each processor may include one or more processor cores. A display adapter 107 may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of I/O devices, for example, an input device 117 (such as a keyboard, a mouse, or a touchscreen), a media tray 121 such as a CD-ROM or a multimedia interface, a transceiver 123 (which may send and/or receive a radio communication signal), a camera 155 (which may capture static and dynamic digital video pictures), and an external USB port 125. Optionally, an interface connected to the I/O interface 115 may be a USB port.

The processor 103 may be any conventional processor, including a reduced instruction set computing ("RISC") processor, a complex instruction set computing ("CISC") processor, or a combination thereof. Optionally, the processor may be a dedicated apparatus such as an application-specific integrated circuit ("ASIC"). Optionally, the processor 103 may be a neural-network processing unit (NPU) or a combination of a neural-network processing unit and the foregoing conventional processor. Optionally, a neural-network processing unit is disposed on the processor 103.

The computer system 101 may communicate with a software deployment server 149 through a network interface 129. The network interface 129 is a hardware network interface, for example, a network interface card. A network 127 may be an external network such as the internet, or an internal network such as the Ethernet or a virtual private network (VPN). Optionally, the network 127 may alternatively be a wireless network, for example, a Wi-Fi network or a cellular network.

A hard disk drive interface 131 is coupled to the system bus 105. The hardware driver interface is connected to a hard disk driver. The system memory 135 is coupled to the system bus 105. Data running in the system memory 135 may include an operating system 137 and an application 143 of the computer system 101.

The operating system includes a shell 139 and a kernel 141. The shell 139 is an interface between a user and the kernel of the operating system. The shell 139 is the outermost layer of the operating system. The shell 139 manages interaction between the user and the operating system waiting for input of the user, explaining the input of the user to the operating system, and processing output results of various operating systems.

The kernel 141 includes components of the operating system that are configured to manage a memory, a file, a peripheral, and a system resource. The kernel 141 directly interacts with hardware. The kernel of the operating system usually runs processes, and provides communication between processes, CPU time slice management, interrupt management, memory management, I/O management, and the like.

The application 143 includes a self-driving-related program 147, for example, a program for managing interaction between a self-driving apparatus and an obstacle on a road, a program for controlling a driving route or speed of the self-driving apparatus, or a program for controlling interaction between the self-driving apparatus 100 and another self-driving apparatus on the road. The application 143 also exists on a system of the software deployment server 149. In an embodiment, when the application 143 needs to be executed, the computer system 101 may download the application 143 from the software deployment server 149.

A sensor 153 is associated with the computer system 101. The sensor 153 is configured to detect an environment around the computer system 101. For example, the sensor 153 may detect an animal, an automobile, an obstacle, a pedestrian crosswalk, and the like. Further, the sensor may detect an environment around the foregoing object such as the animal, the automobile, the obstacle, and the pedestrian crosswalk. For example, the sensor may detect an environment around the animal such as another animal, a weather condition, and brightness of the ambient environment that appear around the animal. Optionally, if the computer system 101 is located on the self-driving apparatus, the sensor may be a camera, an infrared sensor, a chemical detector, a microphone, or the like. When being activated, the sensor 153 senses information at preset intervals, and provides the sensed information for the computer system 101 in real time or in near real-time.

The computer system 101 is configured to determine a driving status of the self-driving apparatus 100 based on sensor data collected by the sensor 153, determine, based on the driving status and a current driving task, a driving operation that needs to be executed by the self-driving apparatus 100, and send, to the control system 106 (which is shown in FIG. 1), a control instruction corresponding to the driving operation. The driving status of the self-driving apparatus 100 may include a driving situation of the self-driving apparatus 100, for example, a head direction, a speed, a location, and an acceleration, and may also include a status of the ambient environment of the self-driving apparatus 100, for example, a location of an obstacle, a location and a speed of another vehicle, a location of a pedestrian crosswalk, or a signal of a traffic light. The computer system 101 may include a task abstraction network and a shared policy network that are implemented by the processor 103. Specifically, the processor 103 determines a current self-driving task. The processor 103 inputs at least one group of historical paths of the self-driving task to the task abstraction network for feature extraction, to obtain a task feature vector representing features of the self-driving task. The processor 103 determines, based on the sensor data collected by the sensor 153, a status vector representing a current driving status of the self-driving apparatus. The processor 103 inputs the task feature vector and the status vector into the shared policy network for processing, to obtain a driving operation that needs to be performed currently by the self-driving apparatus. The processor 103 performs the driving operation through the control system. The processor 103 repeats the foregoing steps of determining and performing the driving operation, until the self-driving task is completed.

Optionally, in the embodiments described in this specification, the computer system 101 may be located far away from the self-driving apparatus, and may perform wireless communication with the self-driving apparatus. The transceiver 123 may send the self-driving task, the sensor data collected by the sensor 153, and other data to the computer system 101, and may further receive a control instruction sent by the computer system 101. The self-driving apparatus may execute the control instruction received by the transceiver from the computer system 101, and perform a corresponding driving operation. In other aspects, some of the processes described in this specification are performed on a processor disposed inside a self-driving vehicle, and others are performed by a remote processor, including taking actions required to perform a single operation.

Figure 3:
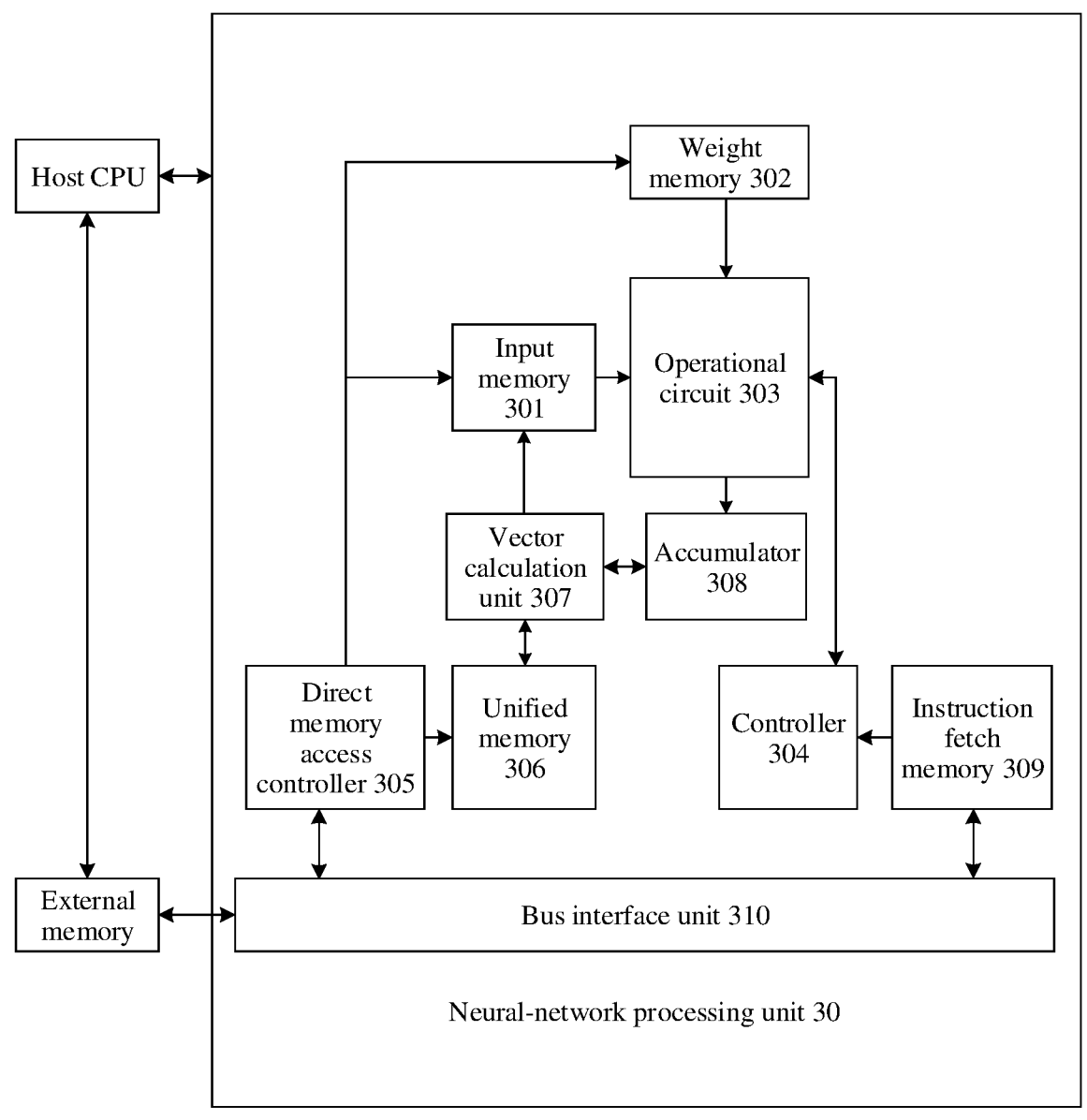
FIG. 3 is a diagram of a hardware structure of a chip according to an embodiment of this application.

FIG. 3 is a diagram of a hardware structure of a chip according to an embodiment of this application. A neural-network processing unit NNPU 30 serves as a coprocessor, and is disposed on a host CPU. The host CPU assigns a task. A core part of the NNPU is an operational circuit 303. The operational circuit 303 is controlled by a controller 304 to extract matrix data in a memory and perform a multiplication operation on the matrix data.

In some implementations, the operational circuit 303 includes a plurality of process engines (PE). In some implementations, the operational circuit 303 is a two-dimensional systolic array. The operational circuit 303 may alternatively be a one-dimensional systolic array or another electronic circuit that can perform mathematical operations such as multiplication and addition. In some implementations, the operational circuit 303 is a general-purpose matrix processor.

For example, it is assumed that there are an input matrix A, a weight matrix B, and an output matrix C. The operational circuit fetches, from a weight memory 302, data corresponding to the matrix B, and buffers the data on each PE of the operational circuit. The operational circuit stores, into an accumulator 308, some matrix results or a final matrix result obtained by performing a matrix operation on the data of the matrix A fetched from an input memory 301 and the matrix B.

A unified memory 306 is configured to store input data and output data. Weight data is directly transferred to the weight memory 302 by using a direct memory access controller (DMAC) 305. The input data is also transferred to the unified memory 306 by using the DMAC.

BIU is the abbreviation for bus interface unit. The bus interface unit 310 is configured to perform interaction between an AXI bus, and the DMAC and an instruction fetch buffer 309.

The bus interface unit 310 is configured for the instruction fetch buffer 309 to obtain an instruction from an external memory, and is further configured for the direct memory access controller 305 to obtain original data of the input matrix A or the weight matrix B from the external memory.

The DMAC is mainly configured to transfer input data in the external memory DDR to the unified memory 306, transfer weight data to the weight memory 302, or transfer input data to the input memory 301. The input data may be one or more groups of historical paths of the self-driving task and a status vector representing a driving status of a self-driving apparatus.

A vector calculation unit 307 includes a plurality of operation processing units, and if necessary, performs further processing such as vector multiplication, vector addition, an exponential operation, a logarithmic operation, or value comparison on outputs of the operational circuit. The vector calculation unit 307 is mainly configured to perform network calculation, such as pooling, batch normalization, and local response normalization, on non-convolutional/fully connected (FC) layers of a neural network.

In some implementations, the vector calculation unit 307 can store a processed output vector into the unified memory 306. For example, the vector calculation unit 307 may apply a non-linear function to the output of the operational circuit 303. For example, a non-linear function is applied to a vector of an accumulated value to generate an activation value. In some implementations, the vector calculation unit 307 generates a normalized value, a combined value, or both. In some implementations, the processed output vector can be used as an activation input to the operational circuit 303, for example, can be used at a subsequent layer in the neural network.

The instruction fetch buffer 309 connected to the controller 304 is configured to store an instruction used by the controller 304.

The unified memory 306, the input memory 301, the weight memory 302, and the instruction fetch buffer 309 are all on-chip memories.

Optionally, each of the processor 113 in FIG. 1 and the processor 103 in FIG. 2 is a host CPU in FIG. 3. Operations of the processor in this specification are all implemented by the host CPU, for example, an operation of determining a task feature vector of a self-driving task. Optionally, the host CPU assigns a self-driving task to the NPU. The NPU extracts a task feature vector of the self-driving task based on one or more groups of historical paths of the self-driving task, and determines, based on the task feature vector and a status vector representing a driving status of the self-driving apparatus, a driving operation that needs to be performed by the self-driving apparatus. In other words, the host CPU determines the one or more groups of historical paths of the self-driving task, and instructs the NPU to extract the task feature vector of the self-driving task based on the one or more groups of historical paths. The host CPU determines, based on data collected by a sensor, the status vector representing the driving status of the self-driving apparatus, and provides the status vector for the NPU, so that the NPU determines the driving operation that needs to be performed by the self-driving apparatus.

FIG. 4 shows a self-driving method according to an embodiment of this application. As shown in FIG. 4, the method may include the following steps.

401. A self-driving apparatus determines a task feature vector of a self-driving task based on M groups of historical paths of the self-driving task.

M is an integer greater than 0. The task feature vector is a vector representing features of the self-driving task. A memory 114 of the self-driving apparatus 100 stores the M groups of historical paths. The self-driving task may be a traveling task, for example, traveling from a current place to another place specified by a user, may be a parking task, or may be another task related to self-driving. Optionally, before performing 401, the self-driving apparatus determines the self-driving task that needs to be handled. The self-driving apparatus may receive, through a peripheral device 108, a self-driving task input by the user. For example, the self-driving apparatus receives the self-driving task input by the user through an in-vehicle computer 148. The user may input the self-driving task through a touchscreen of the in-vehicle computer 148, that is, input a start location and a target location (destination) of the driving task. For another example, the self-driving apparatus receives, through a microphone 150, a voice command input by the user. The voice command indicates a specific self-driving task.

402. The self-driving apparatus determines, based on the task feature vector and a status vector, a target driving operation that needs to be performed.

The status vector is a vector representing a driving status $s_t$ of the self-driving apparatus at a time step t, that is, a vector representing a current driving status $s_t$ of the self-driving apparatus. The driving status $s_t$ may include a location, a speed, a steering angle, an acceleration, and the like of the self-driving apparatus, and a status of an ambient environment of the self-driving apparatus. Optionally, the self-driving apparatus generates the status vector based on data sensed by a sensor system 104. Optionally, the task feature vector is an H-dimensional feature vector, the status vector is a G-dimensional vector, and a value obtained by dividing G by H is greater than a target threshold. The target threshold may be any number greater than 0, for example, 0.2 or 0.5. It may be understood that the self-driving apparatus determines, with reference to both the task feature vector and the status vector, the driving operation that needs to be performed, instead of determining, based on only the status vector, the driving operation that needs to be performed. In this way, an existing historical path can be effectively used to formulate a better driving policy.

403. The self-driving apparatus performs the target driving operation.

After determining the target driving operation, the self-driving apparatus generates a control instruction corresponding to the target driving operation, and sends the control instruction to a control system 106. The control system 106 executes the control instruction, to complete the target driving operation. A process in which the control system 106 implements the target driving operation is as follows. A steering system 132 adjusts the steering angle of the self-driving apparatus to a steering angle indicated by the control instruction. A braking unit 136 correspondingly adjusts a braking force of the braking unit 136 based on a braking value indicated by the control instruction. A throttle 134 correspondingly adjusts an operation speed of an engine 118 based on a throttle value indicated by the control instruction.

Step 401 to step 403 describe only a process in which the self-driving apparatus performs one driving operation (that is, the target driving operation). In actual application, the self-driving apparatus needs to perform a series of driving operations until the current driving task is completed. Therefore, the method shown in FIG. 4 may further include the following steps.

404. The self-driving apparatus determines a driving status $s_{t+1}$ obtained after the self-driving apparatus performs the target driving operation.

$s_{t+1}$ represents a driving status of the self-driving apparatus at a time step (t+1).

405. The self-driving apparatus repeatedly performs step 401 to step 404 until the self-driving apparatus completes the self-driving task.

After performing the target driving operation, the self-driving apparatus reaches a new driving status $s_{t+1}$, and inputs, to the shared policy network for processing, a status vector representing the driving status $s_{t+1}$ and the task feature vector, to obtain a driving operation that needs to be currently performed by the self-driving apparatus (that is, a driving operation that needs to be performed at the time step (t+1)). Optionally, if a quantity of driving operations performed by the self-driving apparatus when the self-driving apparatus completes a specific driving task exceeds a step quantity threshold (that is, a quantity of time steps exceeds the step quantity threshold), the self-driving apparatus executes a new driving task. The step quantity threshold is a maximum quantity of driving operations that can be performed by the self-driving apparatus to handle the self-driving task, that is, a maximum quantity of time steps or tuples included in a group of historical paths. A quantity of time steps included in a group of historical paths may be less than the step quantity threshold. For example, the step quantity threshold is 200. When the self-driving apparatus completes a task at the 120th time step, a group of historical paths including 120 time steps (120 tuples) are obtained. Optionally, after completing the self-driving task, the self-driving apparatus generates and stores a group of historical paths of the self-driving task, to provide a historical path for subsequently determining a task feature vector of another self-driving task.

In this embodiment of this application, the self-driving apparatus determines the task feature vector of the self-driving task by using the historical path of the self-driving task, and further formulates a targeted driving policy based on the task feature vector. The existing historical path can be effectively used to formulate a better driving policy.

Before performing step 401 in FIG. 4, the self-driving apparatus needs to obtain the M groups of historical paths of the self-driving task. It may be understood that the self-driving apparatus cannot perform step 401 when the self-driving apparatus neither stores the historical path of the self-driving task nor can obtain the historical path of the self-driving task from another device. When the self-driving apparatus cannot obtain the historical path of the self-driving task, step 401 and step 402 in FIG. 4 may be replaced by the following steps. The self-driving apparatus processes a zero vector and a status vector by using a shared policy network, to determine the target driving operation that needs to be performed. It may be understood that the zero vector is used as the task feature vector of the self-driving task.

In an optional implementation, a method for determining a task feature vector of a self-driving task by using a task abstraction network is provided. An implementation is as follows. The self-driving apparatus performs feature extraction on the M groups of historical paths of the self-driving task by using the task abstraction network, to obtain the task feature vector.

The task abstraction network is configured to extract a unique feature of each self-driving task, and may use a machine learning model for time sequence processing, for example, a gated recurrent unit (GRU), a long short-term memory network (LSTM), or a temporal convolutional network (TCN). The task abstraction network is a network that is obtained through training and that is configured to extract features of each self-driving task.

Optionally, M is 1, and the task abstraction network performs feature extraction on a group of historical paths of the self-driving task, to obtain the task feature vector. Optionally, M is greater than 1. The task abstraction network performs feature extraction on all of the M groups of historical paths sequentially to obtain M groups of intermediate feature vectors, and averages the M groups of intermediate feature vectors, to obtain the task feature vector. The M groups of intermediate feature vectors one-to-one correspond to the M groups of historical paths, that is, one group of intermediate feature vectors is determined based on one group of historical paths. Optionally, the last layer of the task abstraction network is a fully connected layer, and task features extracted at a hidden layer may be mapped to an H-dimensional feature vector (that is, the task feature vector). It may be understood that the fully connected layer is configured to reduce dimensions of the task features extracted at the hidden layer.

In this implementation, the features of the self-driving task can be accurately and quickly extracted by using the task abstraction network.

In an optional implementation, the self-driving apparatus determines, by using the shared policy network, the driving operation that needs to be performed by the self-driving apparatus. An implementation is as follows. The self-driving apparatus processes the task feature vector and the status vector by using the shared policy network, to obtain the target driving operation.

The shared policy network may be a network that can implement reinforcement learning by using any machine learning model such as a multilayer perceptron (MLP) or a recurrent neural network (RNN). In actual application, the self-driving apparatus abstracts a task feature vector of each self-driving task based on a historical path of the task by using the task abstraction network, combines the task feature vector and information such as a status vector and a return, and inputs the task feature vector and the information that are combined to the shared policy network for processing. The shared policy network performs processing to obtain a corresponding driving operation. Optionally, the self-driving apparatus inputs only the task feature vector and the status vector representing the current driving status of the self-driving apparatus into the shared policy network.

Optionally, the self-driving apparatus combines the task feature vector and the status vector into one vector, and then inputs the vector to the shared policy network for processing. For example, the status vector is $s_0$, the task feature vector is $h(\theta_{TA})$, and $[s_0, h(\theta_{TA})]$ is a vector obtained by combining the task feature vector and the status vector. The shared policy network may be a network used to implement reinforcement learning, for example, an MLP or an RNN. Optionally, each driving operation has three dimensions: a steering angle, a throttle, and braking. It may be understood that each driving operation may be represented by using a three-dimensional vector, that is, represented by using a vector including three components (a steering angle, a throttle value, and a braking value). That the self-driving apparatus processes the task feature vector and the status vector by using the shared policy network, to obtain the target driving operation may be inputting the task feature vector and the status vector into the shared policy network for processing. The shared policy network outputs a three-dimensional vector representing the target driving operation, that is, a vector including a steering angle, a throttle value, and a braking value. Optionally, the self-driving apparatus generates a control instruction based on the three-dimensional vector representing the target driving operation, and sends the control instruction to the control system 106, so that the control system 106 implements the target driving operation. For a self-driving apparatus with a steering wheel system, the steering angle is an angle by which a steering wheel is to rotate leftward or rightward. For a self-driving apparatus without a steering wheel system, the steering angle is an angle by which the front wheels of an automobile are to rotate leftward or rightward, that is, an angle between a center line of a location to which the front wheels are rotated and a center line of the front wheels that exists when the front wheels are not deflected. The throttle value is positively related to the operating speed of the engine 118. The braking value is positively or negatively correlated to the braking force provided by the braking unit 136.

In this implementation, the shared policy network determines, based on the task feature vector and the status vector, the driving operation that needs to be performed, and can formulate different targeted driving policies based on features of different self-driving tasks.

Figure 5:
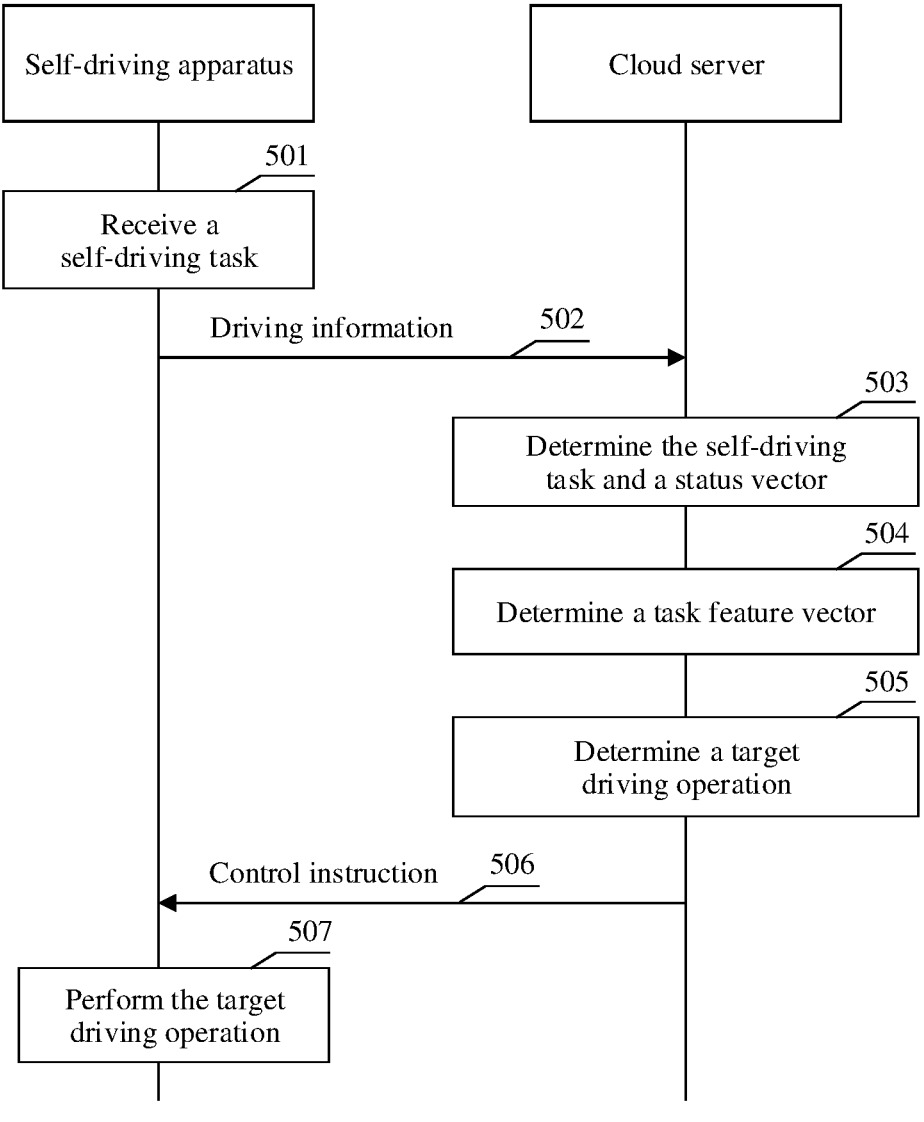
FIG. 5 is a schematic flowchart of another self-driving method according to an embodiment of this application.

In the method in FIG. 4, the self-driving apparatus needs to determine a driving operation by itself. The following describes a self-driving method in which the self-driving apparatus does not need to determine a driving operation by itself. FIG. 5 shows another self-driving method according to an embodiment of this application. As shown in FIG. 5, the method may include the following steps.

501. A self-driving apparatus receives a self-driving task.

The self-driving apparatus may receive, through a peripheral device 108, a self-driving task input by a user. For example, the self-driving apparatus receives the self-driving task input by the user through an in-vehicle computer 148. The user may input the self-driving task through a touch-screen of the in-vehicle computer 148, that is, input a start location and a target location (destination) of the driving task. For another example, the self-driving apparatus receives, through a microphone 150, a voice command input by the user. The voice command indicates the self-driving apparatus to process a specific self-driving task. For another example, the self-driving apparatus receives, through a transceiver, a self-driving task sent by a user terminal (a mobile phone). The self-driving apparatus may alternatively receive a self-driving task in another manner. This is not limited in this embodiment of this application.

502. The self-driving apparatus sends driving information to a cloud server through the transceiver.

Figure 6:
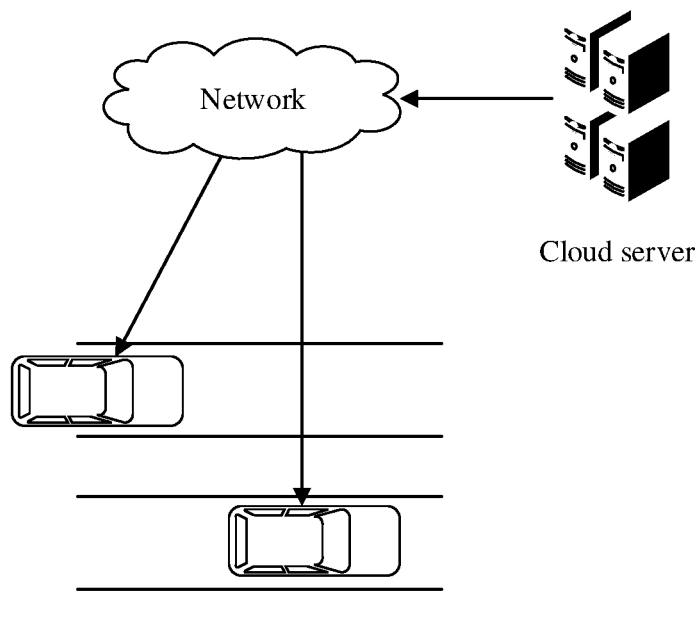
FIG. 6 is a schematic architecture diagram of a self-driving system according to an embodiment of this application.

The driving information may include an identifier of the self-driving apparatus, the self-driving task, and sensor data related to determining a driving status of the self-driving apparatus. As shown in FIG. 6, the self-driving apparatus and the cloud server may interact with each other by using a network. The network may include various configurations and protocols, including the internet, the World Wide Web, the intranet, a virtual private network, a wide area network, a local area network, a private network using one or more company-specific communications protocols, the Ethernet, Wi-Fi, and HTTP, and various combinations thereof. Optionally, the self-driving apparatus may send current driving information to the cloud server in real time or at preset intervals.

503. The cloud server determines, based on the driving information, the current self-driving task of the self-driving apparatus and a status vector representing the driving status of the self-driving apparatus.

The cloud server may determine the status vector based on the sensor data in the driving information.

504. The cloud server determines a task feature vector of the self-driving task based on M groups of historical paths of the self-driving task.

The cloud server may obtain the M groups of historical paths from a memory (or a database) of the cloud server or a memory associated with the cloud server. The cloud server may perform feature extraction on the M groups of historical paths by using a task abstraction network, to obtain the task feature vector.

505. The cloud server determines, based on the task feature vector and the status vector, a target driving operation that needs to be performed by the self-driving apparatus.

Optionally, the cloud server processes the task feature vector and the status vector by using a shared policy network, to obtain the target driving operation.

506. The cloud server sends a control instruction to the self-driving apparatus.

The control instruction is configured to indicate the self-driving apparatus to perform the target driving operation.

507. The self-driving apparatus performs the target driving operation.

In actual application, step 502 to step 507 (except for 504) are repeatedly performed until the self-driving task is completed. After determining the self-driving task of the self-driving apparatus, the cloud server may determine, in step 503, only the status vector representing the current driving status of the self-driving apparatus. It may be understood that the cloud server may simultaneously control a plurality of self-driving apparatuses to implement a self-driving task of each self-driving apparatus. A quantity of historical paths obtainable by the cloud server is far greater than a quantity of historical paths stored by one self-driving apparatus, so that a task feature vector of a self-driving task can be determined more accurately, and a driving operation that needs to be performed by the self-driving apparatus can be further determined more properly. The self-driving apparatus only needs to send the self-driving task and the data collected by the sensor to the cloud server, and perform a corresponding driving operation according to a control instruction sent by the cloud server.

In this embodiment of this application, a processing capability and a data storage capability of the cloud server are far beyond those of the self-driving apparatus. The cloud server may fully use a processing resource and a storage resource of the cloud server to provide a self-driving service for each self-driving apparatus. In addition, the self-driving apparatus does not need to determine, by itself, a driving operation that needs to be executed, therefore workload is comparatively small.

With reference to specific examples of a task abstraction network and a shared policy network provided in the embodiments of this application, the following describes a process in which a self-driving apparatus processes one self-driving task, that is, a process of obtaining a group of historical paths through exploration in a specific manner.

Figure 7:
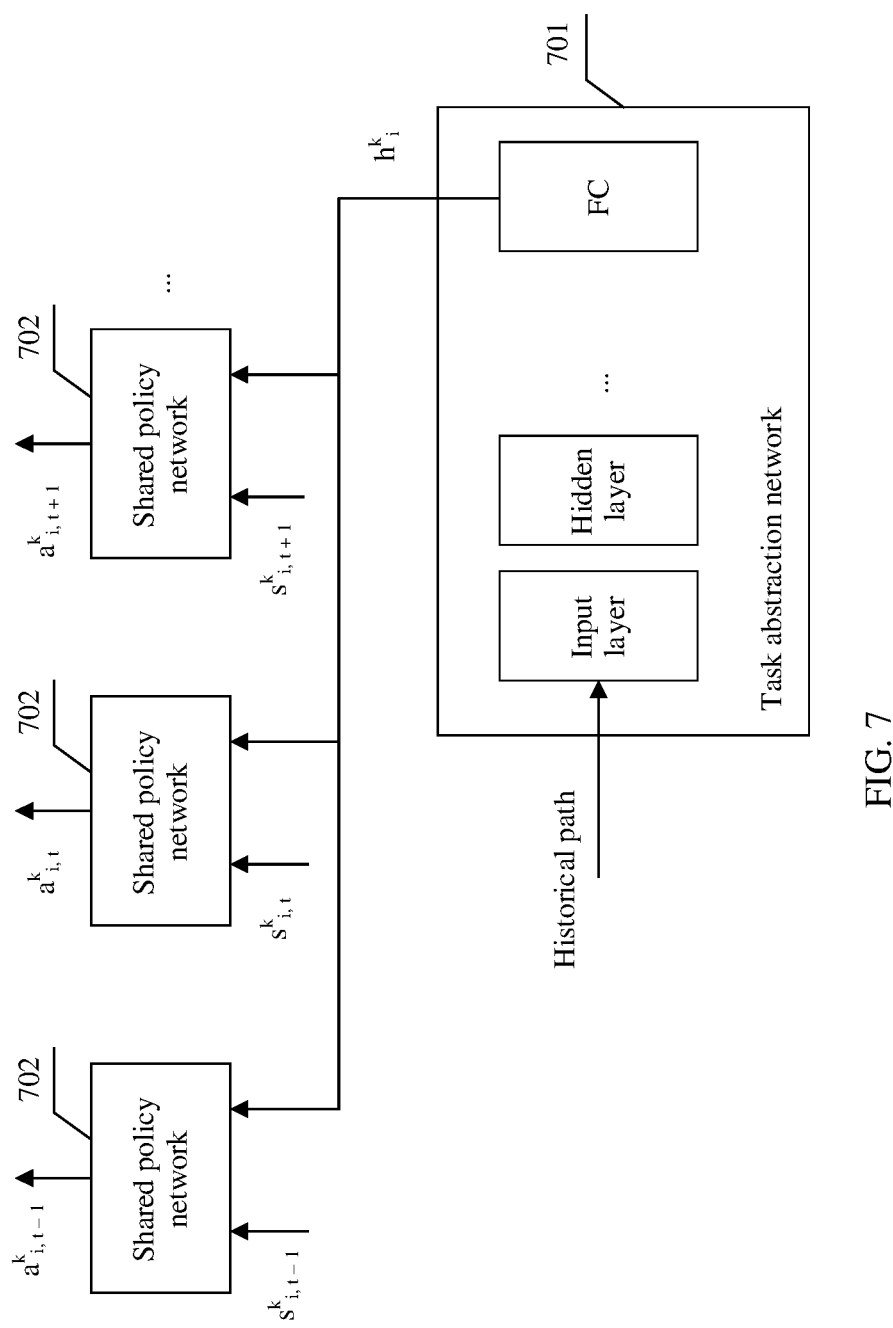
FIG. 7 is a schematic diagram of a task abstraction network and a shared policy network according to an embodiment of this application.

FIG. 7 is a schematic diagram of a task abstraction network and a shared policy network according to an embodiment of this application. As shown in FIG. 7, 701 represents a task abstraction network. For example, the task abstraction network is a GRU, the task abstraction network includes at least one hidden layer, a last layer of the task abstraction network is a fully connected layer, an input of the task abstraction network is a group of historical paths of a task i, and an output is a task feature vector $h^k_i$ of the task. 702 represents a shared policy network. For example, the shared policy network is an MLP, an input of the shared policy network is the task feature vector $h^k_i$ and a status vector of the self-driving apparatus, and an output of the shared policy network is a driving operation that the self-driving apparatus currently needs to perform. As shown in FIG. 7, $s^k_{i,\,t-1}$ represents a status vector of the self-driving apparatus at a time step (t−1), and $a^k_{i,\,t-1}$ represents a driving operation output by the shared policy network at the time step (t−1), that is, a driving operation that needs to be performed by the self-driving apparatus at the time step (t−1). $s^k_{i,\,t}$ represents a status vector of the self-driving apparatus at a time step t, that is, a vector representing a driving status reached after the self-driving apparatus performs $a^k_{i,\,t-1}$ at the time step (t−1), and $a^k_{i,\,t}$ represents a driving operation output by the shared policy network at the time step t, that is, a driving operation that needs to be performed by the self-driving apparatus at the time step t. $s^k_{i,\,t+1}$ represents a status vector of the self-driving apparatus at a time step (t+1), and $a^k_{i,\,t+1}$ represents a driving operation output by the shared policy network at the time step (t+1), that is, a driving operation that needs to be performed by the self-driving apparatus at the time step (t+1).

It may be understood that the shared policy network inputs, at each time step, a status vector and a task feature vector that correspond to the self-driving apparatus at the time step, the shared policy network determines, based on the status vector and the task feature vector, a driving operation that needs to be performed by the self-driving apparatus at the time step, the self-driving apparatus determines a driving status reached after the self-driving apparatus performs the driving operation at the time step, and the foregoing steps are repeated until the self-driving apparatus completes the task or a quantity of driving operations performed by the self-driving apparatus reaches a step quantity threshold, to obtain a group of historical paths.

If a quantity of driving operations performed by the self-driving apparatus to complete the self-driving task does not reach the step quantity threshold, historical paths of the task may be denoted as $\tau=(s_0, a_0, r_0, s_1, a_1, r_1, \ldots, s_t, a_t, r_t)$, that is, the self-driving apparatus completes the task after performing the driving operation $a_t$, or if a quantity of driving operations performed by the self-driving apparatus to complete the self-driving task reaches the step quantity threshold, historical paths of the task are recorded as $\tau=(s_0, a_0, r_0, s_1, a_1, r_1, \ldots, s_H, a_H, r_H)$. t represents a time step, H is the step quantity threshold, and $s_t$, $a_t$, and $r_t$ sequentially represent a driving status (status), a driving operation (action), and a return of the self-driving apparatus at the time step t. A process in which the self-driving apparatus performs one self-driving task is a process of obtaining a group of historical paths of the task. A specific execution process is as follows. The self-driving apparatus inputs one or more groups of historical paths of the self-driving task to the task abstraction network for processing, to obtain a task abstraction feature vector $h=h(\theta_{TA})$ of the task. The self-driving apparatus inputs $[s_0, h(\theta_{TA})]$ into the shared policy network, the shared policy network outputs a driving operation $a_0=a_0$ $(\theta_{TA}, \theta_{policy})$ at a probability of $\pi=\pi\theta_{policy}(a_0|s_0, h(\theta_{TA}))$, and so represents a driving status of the self-driving apparatus at a current time step. The self-driving apparatus performs a driving operation $a_0$, and determines a driving status $s_1$ reached by performing the driving operation $a_0$ and a return $r_0$ for performing the driving operation $a_0$. The self-driving apparatus inputs $[s_1, h(\theta_{TA})]$ to the shared policy network. The shared policy network outputs a driving operation $a_1=a_1(\theta_{TA}, \theta_{policy})$ at a probability of $\pi=\pi\theta_{policy}(a_1|s_1, h(\theta_{TA}))$. The foregoing steps are repeated until the task is completed or a quantity of driving operations performed by the self-driving apparatus reaches the step quantity threshold. $\theta_{TA}$ is a parameter of the task abstraction network, $\theta_{policy}$ is a parameter of the shared policy network, and both $[s_0, h(\theta_{TA})]$ and $[s_1, h(\theta_{TA})]$ are combinations of a status vector and a task feature vector.

The shared policy network outputs, at a probability of $\pi=\pi\theta_{policy}(a_t|s_t, h(\theta_{TA}))$, a driving operation corresponding to a time step t. The following describes specific examples of outputting a discrete action and a continuous action.

Discrete action: Assuming that there are a total of eight driving operations, eight probabilities respectively corresponding to the eight driving operations are output from a last layer (a softmax layer) of the shared policy network, and the shared policy network selects a driving operation based on these probabilities and outputs the driving operation.

Continuous action: The last layer of the shared policy network is a fully connected layer, and the fully connected layer outputs a two-dimensional vector (a mean) representing a driving operation. The shared policy network samples and outputs the driving operation according to a normal distribution by using a mean and a variance representing the driving operation. Optionally, the policy network outputs both the mean and the variance. Optionally, the self-driving apparatus outputs a variance based on an input driving status by using a fully connected network.

The foregoing embodiment describes the method for handling the self-driving task by the self-driving apparatus. In actual application, before handling the self-driving task, the self-driving apparatus further needs to optimize the task abstraction network and the shared policy network, that is, trains the task abstraction network and the shared policy network, to obtain a better processing policy.

The following describes a method for updating a group of task abstraction network parameters of a task abstraction network with respect to a self-driving task.

The self-driving apparatus may update, based on a loss of one or more groups of historical paths of the self-driving task, a group of task abstraction network parameters corresponding to the self-driving task, so that the task abstraction network performs feature extraction on the one or more groups of historical paths by using the group of task abstraction network parameters, to obtain a task feature vector of the self-driving task. Specifically, the self-driving apparatus updates a group of relative parameters of the task abstraction network with respect to the self-driving task by using gradient values of a first loss function relative to parameters of the task abstraction network, so that differences between the parameters of the task abstraction network and the group of relative parameters are the group of task abstraction network parameters. The first loss function is configured to calculate a loss of the group of historical paths or a sum of losses of the groups of historical paths. Specifically, when performing feature extraction on a group of historical paths, the task abstraction network may handle the self-driving task by using target parameters as the parameters of the task abstraction network, to obtain a task feature vector. The target parameters are differences between the parameters of the task abstraction network and a group of relative parameters of the task abstraction network with respect to the self-driving task. The group of relative parameters of the task abstraction network with respect to the self-driving task may be a group of parameters obtained after a plurality of updates.

Optionally, a calculation formula of the first loss function is as follows:

$$L(\theta_{TA}) = E_\tau\left[\sum_{t=0}^{H}\left(\log \pi_{\theta_{policy}}(a_t \mid s_t, h(\theta_{TA}))\left(\sum_{t'=t}^{H}r_{t'} - b(s_t)\right)\right)\right] \quad (1)$$

$\theta_{TA}$ represents a parameter of the task abstraction network, $\pi_{\theta_{policy}}(a_t \mid s_t, h(\theta_{TA}))$ represents a probability that an input of the shared policy network is a status vector $s_t$ and a feature vector $h(\theta_{TA})$, and an output of the shared policy network is a driving operation $a_t$, H is a step quantity threshold, and t represents a time step, $b(s_t)$ represents a reference function used to calculate a return obtained by the self-driving apparatus at the time step t, $r_t$ represents a real return obtained by the self-driving apparatus at the time step t, $E_\tau[\ ]$ represents calculating an expectation in a bracket, and $$\sum_{t'=t}^{H}r_{t'}$$

represents calculating returns obtained from the time step t to the time step H.

An example of the reference function $b(s_t)$ is as follows: $b(s_t) =$ Featurest*C. Featurest$=[s_t, s_t*s_t, a_t, a_t*a_t, a_t*a_t*a_t]$. $s_t$ and $a_t$ sequentially represent a driving status and a driving operation of the self-driving apparatus at the time step t, C is a group of parameters that minimize $(C*\text{Featurest}-r_t)^2$, and $t=0, \ldots, H$. C is determined by using a common technical means in this field, and the technical means is not described in detail herein. In actual application, an appropriate reference function may be selected based on a requirement. The reference function is not limited in this embodiment of this application.

Optionally, a group of task abstraction network parameters of the task abstraction network with respect to the self-driving task are updated by using the following formula:

$$\theta_{TA,i}^{k} = \theta_{TA,i}^{k-1} - \alpha\blacksquare\nabla_{\theta_{TA,i}^{k-1}} L_{T_i}(\tau_i^{k-1} \mid \theta_{TA,i}^{k-1}) \quad (2)$$

$T_i$ represents the $i^{th}$ task, and k is a quantity of updates of this group of task abstraction network parameters, $$\theta_{TA,i}^{k-1}$$

is a parameter obtained before the group of task abstraction network parameters are updated for the $k^{th}$ time, and $$\theta_{TA,i}^{k}$$

is a parameter obtained after the group of task abstraction network parameters are updated for the $k^{th}$ time, $L_{T_i}$ is a loss function of the task, $\alpha$ is a target learning rate (an adaptive learning rate), is a tensor, and has a same value as $$\theta_{TA,i}^{k},$$

$\nabla$ is a gradient symbol, and $$\nabla_{\theta_{TA,i}^{k-1}} L_{T_i}$$

represents a derivative of a loss function $L_{T_i}$ with respect to $$\theta_{TA,i}^{k-1},$$

and "$\blacksquare$" represents multiplication of corresponding elements of two tensors, that is, two elements at same locations of the two tensors are multiplied to obtain a tensor.

Figure 8:
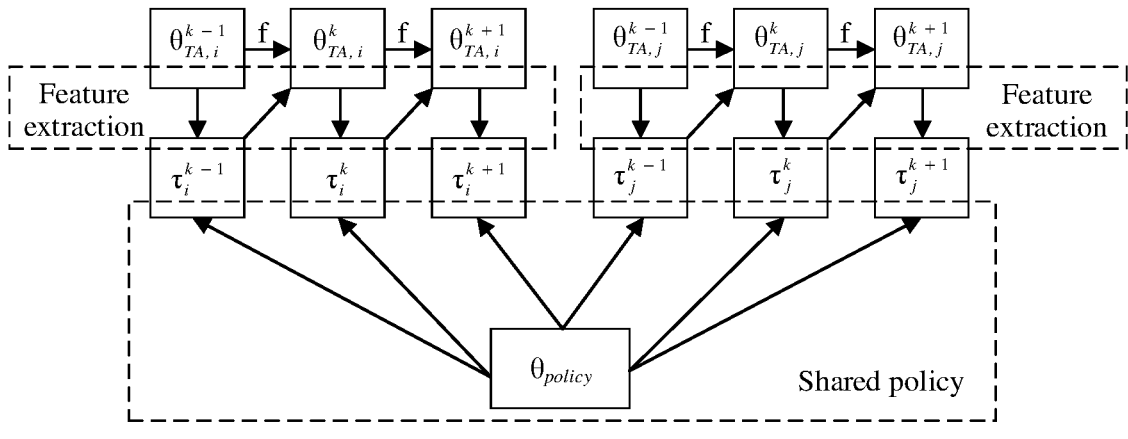
FIG. 8 is a schematic diagram of a task abstraction network parameter update according to an embodiment of this application.

FIG. 8 is a schematic diagram of a task abstraction network parameter update according to an embodiment of this application. As shown in FIG. 8, $$\theta_{TA,i}^{k}$$

a parameter obtained after a group of task abstraction network parameters of a task abstraction network with respect to the $i^{th}$ task are updated for the $k^{th}$ time, $\theta_{policy}$ represents a parameter of a shared policy network, $$\tau_i^{k}$$

represents a group of historical paths obtained by processing the $i^{th}$ task by using the task abstraction network (with the parameter of $$\theta_{TA,i}^{k}$$

and the shared policy network (with the parameter of $\theta_{policy}$), $$\tau_i^{k+1}$$

represents a group of historical paths obtained by processing the $i^{th}$ task by using a task abstraction network (with a parameter of $$\theta_{TA,i}^{k+1})$$

and a shared policy network (with a parameter of $\theta_{policy}$), $$\theta_{TA,i}^{k-1}$$

is a parameter obtained after a group of task abstraction network parameters of the task abstraction network with respect to the $i^{th}$ task are updated for the $(k-1)^{th}$ time, and f represents updating a group of task abstraction network parameters of the task abstraction network with respect to the task by using formula (2). For example, $$\theta_{TA,i}^{k-1}$$

is updated to $$\theta_{TA,i}^{k}$$

by using formula (2). AS shown in FIG. 8, $$\theta_{TA,j}^{k}$$

is a parameter obtained after a group of task abstraction network parameters of the task abstraction network with respect to the $j^{th}$ task are updated for the $k^{th}$ time. It may be understood that the task abstraction network has a group of task abstraction network parameters with respect to any task, and the self-driving apparatus may update the group of task abstraction network parameters of the task abstraction network with respect to the any task in the manner shown in FIG. 8.

It may be understood that, before extracting a task feature vector of the self-driving task by using the task abstraction network, the self-driving apparatus may update, by using one or more groups of historical paths of the self-driving task, a group of task abstraction network parameters of the task abstraction network with respect to the self-driving task for one or more times, so that the task abstraction network extracts a feature vector of the self-driving task by using the updated group of task abstraction network parameters. The updating a group of task abstraction parameters of the task abstraction network with respect to the self-driving task may be updating a group of relative parameters of the task abstraction network with respect to the self-driving task, so that differences between parameters of the task abstraction network and the group of relative parameters are the group of task abstraction parameters. It may be understood that, before the group of relative parameters of the task abstraction network with respect to the self-driving task are updated for the first time by using a loss of the one or more groups of historical paths of the self-driving task, the group of task abstraction network parameters corresponding to the self-driving task are the parameters of the task abstraction network.

In this parameter update manner, a group of task abstraction network parameters of the task abstraction network with respect to any task may be continuously updated until the group of task abstraction network parameters no longer changes or a quantity of updates reaches a specified threshold, so that the task abstraction network processes the task by using the group of task abstraction parameters, to obtain a task feature vector that better represents features of the task. The foregoing update process may be considered as an inner-update of a task. That is, only a group of task abstraction network parameters corresponding to each task are updated, but a parameter and $\theta_{policy}$ of a task abstraction network remain unchanged. It is noted that the shared policy network does not participate in the inner-update of the task, because the policy is shared by each task and indicates the nature of a problem itself, such as an environment parameter, how to go straight, or how to turn. The inner-update of the task is updating a group of relative parameters of the task abstraction network with respect to the self-driving task, but is not updating the parameters of the task abstraction network.

The following describes how to update the parameters of the task abstraction network, the parameters of the shared policy network, and the target learning rate.

The target learning rate is a learning rate for updating the group of task abstraction network parameters of the task abstraction network with respect to the self-driving task. Optionally, the parameters of the task abstraction network are updated by using gradient values of a second loss function relative to the parameters of the task abstraction network, the parameters of the shared policy network are updated by using gradient values of the second loss function relative to the parameters of the shared policy network, and the target learning rate is updated by using gradient values of the second loss function relative to the target learning rate. The second loss function is configured to calculate a sum of F losses of F self-driving tasks or a mean of losses of F losses. The F losses one-to-one correspond to the F self-driving tasks, a loss of any one of the F self-driving tasks is obtained through calculation based on a latest batch of historical paths of the any task, and F is an integer greater than 1.

Optionally, a calculation formula of the second loss function is as follows:

$$L(\theta)=E_t[\min\{r_t(\theta)A_t,\text{clip}(r_t(\theta),1-\varepsilon,1+\varepsilon,r_t(\theta))A_t\}-\beta KL[\pi_{\theta_{old}},\pi_\theta]].$$

$\theta=\{\theta_{TA}, \theta_{policy}, \alpha\}$, where $\theta_{TA}$ represents a parameter of the task abstraction network, $\theta_{policy}$ represents a parameter of the shared policy network, and $\alpha$ represents the target learning rate, $$r_t(\theta) = \frac{\pi_\theta(a_t \mid s_t)}{\pi_{\theta_{old}}(a_t \mid s_t)},$$

where $\pi_\theta(a_t|s_t)$ represents a probability that, after $\theta$ is updated, an input of the shared policy network is a status vector $s_t$, and an output is a driving operation $a_t$, $\pi_{\theta_{old}}(a_t|s_t)$ represents a probability that, before $\theta$ is updated, an input of the shared policy network is the status vector $s_t$, and an output is the driving operation $a_t$, $$A_t = \sum_{t'=t}^{H} r_{t'} - b(s_t),$$

where H is a maximum quantity of steps, $b(s_t)$ represents a reference function used to calculate a return obtained by the self-driving apparatus at a time step t, and $r_t$, represents a real return obtained by the self-driving apparatus at the time step t, clip $(r_t(\theta), 1-\varepsilon, 1+\varepsilon, r_t(\theta))$ represents that a minimum value of $r_t(\theta)$ is $1-\varepsilon$, a maximum value of $r_t(\theta)$ is $1+\varepsilon$, and $\varepsilon$ is a constant term greater than 0, $KL[\pi_{\theta_{old}}, \pi_\theta]]$ represents relative entropy of two probability distributions obtained before and after $\theta$ is updated, and $\beta$ is a hyperparameter, and $E_t[\ ]$ represents calculating an expectation in a bracket.

Optionally, $\theta$ is updated by using a gradient descent method. Specifically, a gradient value is obtained by performing derivation on $L(\theta)$ with respect to $\theta$, and $\theta$ is updated by using the gradient descent method. Optionally, $\theta$ is updated by using a policy gradient optimization method. The policy gradient optimization method is a common technical means in this field, and is not described in detail herein. The update in this step may be understood as a meta-update (Meta-Update). When knowing a loss function, a person skilled in the art may update $\theta$ by using a plurality of different methods. An update manner of $\theta$ is not limited in this application. For a task abstraction network, a comparatively good initial value representing features of a task is obtained through updating, and a task feature vector representing features of any task can be obtained by performing several inner-updates by using the comparatively good initial value as a parameter. For a shared policy network, a better policy can be learned through updating.

Figure 9:
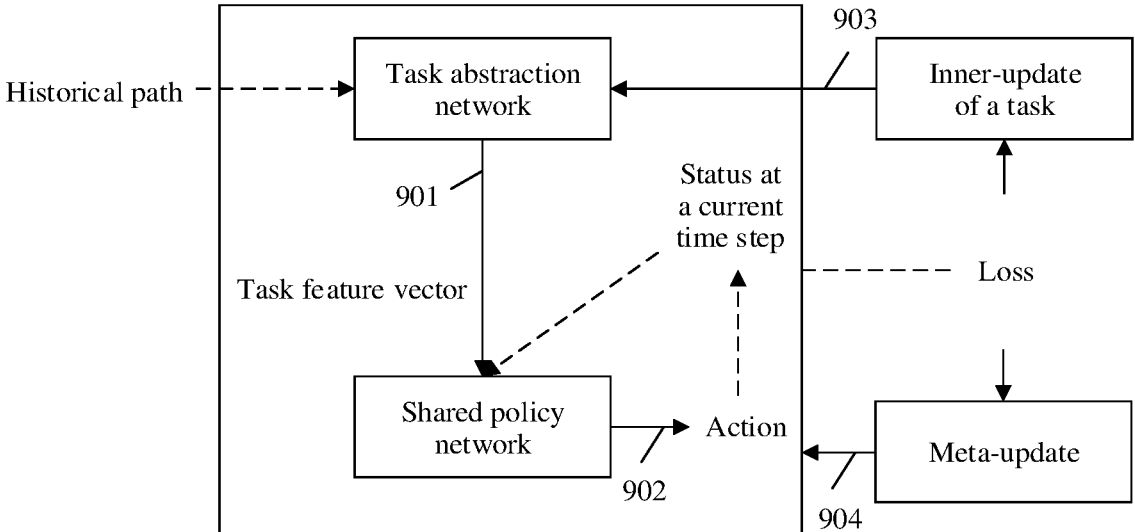
FIG. 9 is a schematic diagram of a parameter updating process according to an embodiment of this application.

The foregoing describes the inner-update of the task and the meta-update. The following describes the two update modes in a combined manner. FIG. 9 is a schematic diagram of a parameter updating process according to an embodiment of this application. As shown in FIG. 9, the parameter updating process includes the following steps.

901. A self-driving apparatus performs feature extraction on M groups of historical paths of a self-driving task by using a task abstraction network, to obtain a task feature vector.

M is an integer greater than 0. An implementation of step 901 is the same as that of step 401 in FIG. 4. A function of the task abstraction network is implemented by a task abstraction module. The task abstraction module may be hardware, or may be implemented by software.

902. The self-driving apparatus processes the task feature vector and a status vector by using a shared policy network, and outputs a driving operation (action).

The status vector is a vector representing a current driving status of the self-driving apparatus. An implementation of step 902 is the same as that of step 402 in FIG. 4. After performing the driving operation, the self-driving apparatus reaches a new driving status, and inputs, to the shared policy network, the task feature vector and a status vector representing the new driving status. Step 902 is repeatedly performed until a group of historical paths are obtained. A function of the shared policy network is implemented by a policy sharing module. The policy sharing module may be hardware, or may be implemented by software. Optionally, the processor implements functions of the task abstraction network and the shared policy network.

903. The self-driving apparatus updates a group of task abstraction network parameters of the task abstraction network with respect to the self-driving task.

Step 903 is a step of the foregoing inner-update of the task. After the group of task abstraction network parameters of the task abstraction network with respect to the self-driving task are updated, the task abstraction network performs feature extraction on the group of historical paths by using the updated group of task abstraction network parameters, to obtain a new task abstraction vector.

904. The self-driving apparatus updates the parameters of the task abstraction network, the parameters of the shared policy network, and a target learning rate (a meta-update) by using losses of at least two self-driving tasks.

The target learning rate is a learning rate for updating the group of task abstraction network parameters of the task abstraction network with respect to the self-driving task. It may be understood that the self-driving apparatus may process different self-driving tasks in a same manner, to obtain historical paths of the different self-driving tasks. The losses of the at least two self-driving tasks each are obtained by combining losses of the last batch of historical paths of a respective task and calculating a mean of the losses.

In this embodiment of this application, before task abstraction features of a task are extracted by using the task abstraction network, a group of task abstraction network parameters of the task abstraction network with respect to the task are optimized, so that a better task feature vector can be extracted. A meta-update is performed with reference to information about all the tasks, so that the shared policy network processes each task efficiently.

Figure 10:
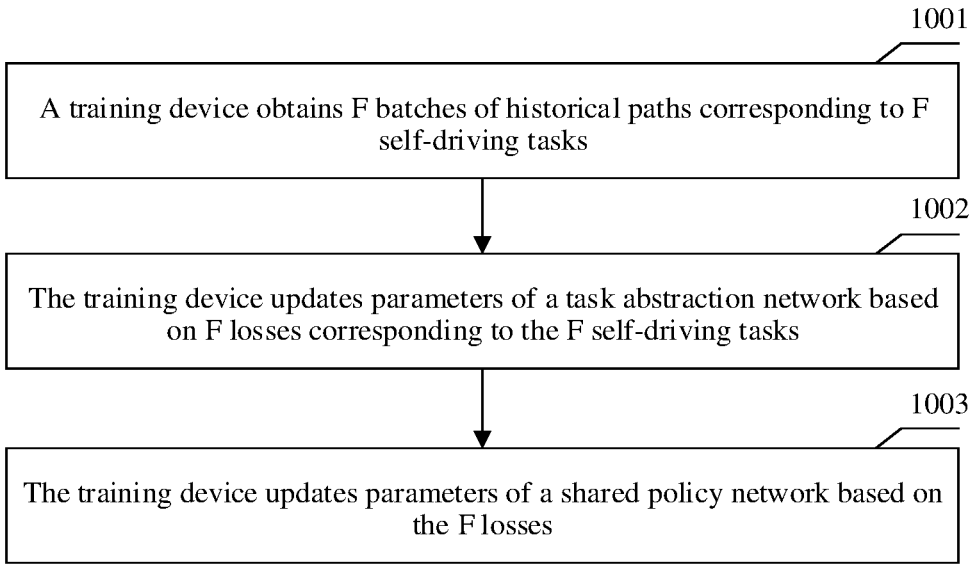
FIG. 10 is a schematic flowchart of a training method according to an embodiment of this application.

FIG. 10 shows a training method according to an embodiment of this application. The training method is used to perform training to obtain the task abstraction network and the shared policy network that are used in the foregoing embodiments. The method may include the following steps.

1001. A training device obtains F batches of historical paths corresponding to F self-driving tasks.

The F batches of historical paths one-to-one correspond to the F self-driving tasks, any one of the F batches of historical paths includes at least one group of historical paths, and F is an integer greater than 1. The training device may be a self-driving apparatus, a cloud server, or another device. This is not limited in this application. Optionally, a memory of the training device or a database associated with the training device stores the F batches of historical paths corresponding to the F self-driving tasks. The training device may obtain the F batches of historical paths from the memory of the training device or the database associated with the training device.

1002. The training device updates parameters of a task abstraction network based on F losses corresponding to the F self-driving tasks.

The task abstraction network is configured to determine, based on a historical path of any one of the F self-driving tasks, a task feature vector representing features of the any task. The F losses one-to-one correspond to the F self-driving tasks. Optionally, the training device updates the parameters of the task abstraction network by using gradient values of a second loss function with respect to the parameters of the task abstraction network. The second loss function is configured to calculate a sum of the F losses of the F self-driving tasks or a mean of the F losses, the F losses one-to-one correspond to the F self-driving tasks, and a loss of any one of the F self-driving tasks is obtained through calculation based on a latest batch of historical paths of the any task.

1003. The training device updates parameters of a shared policy network based on the F losses.

The shared policy network is configured to determine, based on a status vector and a task feature vector extracted by the task abstraction network, a driving operation that needs to be performed by the self-driving apparatus. The status vector is configured to represent a driving status of the self-driving apparatus. Optionally, the training device updates the parameters of the shared policy network by using gradient values of the second loss function relative to the parameters of the shared policy network.

In this embodiment of this application, the parameters of the task abstraction network and the parameters of the shared policy network are updated based on losses of all tasks, so that the task abstraction network and the shared policy network can process each task efficiently.

Figure 11:
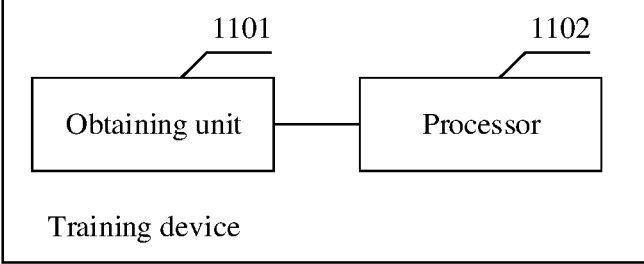
FIG. 11 is a schematic structural diagram of a training device according to this application.

FIG. 11 is a schematic structural diagram of a training device according to this application. As shown in FIG. 11, the training device includes an obtaining unit 1101 and a processor 1102.

The obtaining unit 1101 is configured to obtain F batches of historical paths corresponding to F self-driving tasks. The F batches of historical paths one-to-one correspond to the F self-driving tasks, any one of the F batches of historical paths includes at least one group of historical paths, and F is an integer greater than 1.

The processor 1102 is configured to update parameters of a task abstraction network based on F losses corresponding to the F self-driving tasks. The task abstraction network is configured to determine, based on a historical path of any one of the F self-driving tasks, a task feature vector representing features of the any task, and the F losses one-to-one correspond to the F self-driving tasks.

The processor 1102 is further configured to update parameters of a shared policy network based on the F losses. The shared policy network is configured to determine, based on a status vector and a task feature vector extracted by the task abstraction network, a driving operation that needs to be performed by the self-driving apparatus, and the status vector is configured to represent a driving status of the self-driving apparatus.

In this embodiment of this application, the parameters of the task abstraction network and the parameters of the shared policy network are updated based on losses of all tasks, so that the task abstraction network and the shared policy network can process each task efficiently.

Figure 12:
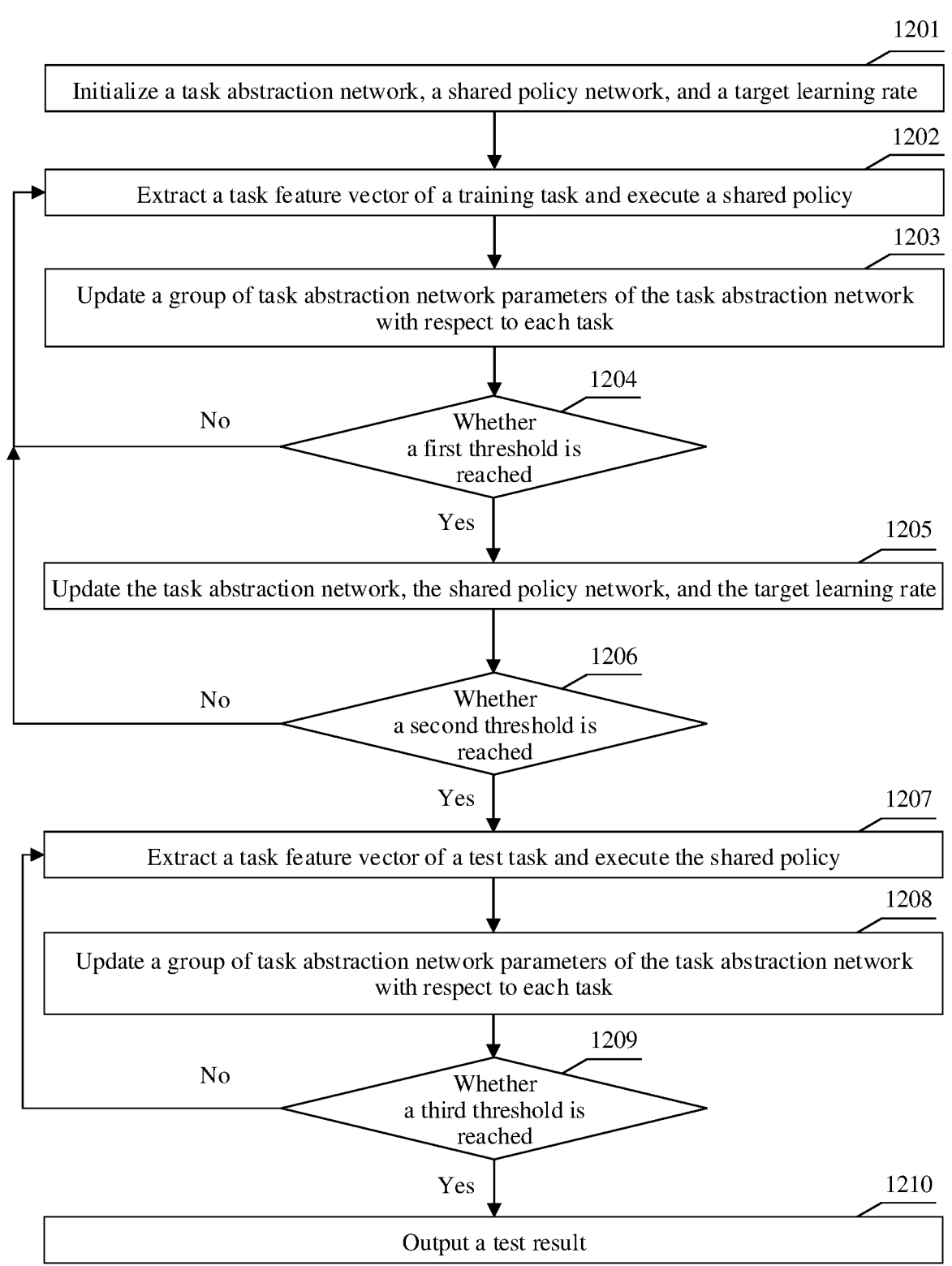
FIG. 12 is a flowchart of a method for training a task abstraction network and a shared policy network according to an embodiment of this application.

FIG. 12 is a flowchart of a method for training a task abstraction network and a shared policy network according to an embodiment of this application. As shown in FIG. 12, the method may include the following steps.

1201. Initialize parameters of a task abstraction network, parameters of a shared policy network, and a target learning rate.

In this embodiment of this application, the parameters of the task abstraction network and the parameters of the shared policy network may be initialized in any neural network initialization manner, and an initialization manner is not limited. For example, both the parameters of the task abstraction network and the parameters of the shared policy network are initialized to zero (zero-initialized). For another example, the parameters of the task abstraction network and the parameters of the shared policy network are initialized in a random manner (randomly initialized). The target learning rate is a tensor that has a same value as a parameter $\theta_{TA}$ of the task abstraction network. Optionally, an initial value of each element included in the target learning rate is 0.01.

1202. Input F batches of historical paths corresponding to F tasks into the task abstraction network for feature extraction, to obtain F task feature vectors, where the shared policy network processes the F task feature vectors and status vectors corresponding to the F task feature vectors, to obtain F groups of historical paths that one-to-one correspond to the F tasks.

The F task feature vectors one-to-one correspond to the F tasks, and the F tasks are training tasks used to train the task abstraction network and the shared policy network. A status vector corresponding to a task feature vector represents a status, at a current time step, of a task corresponding to the task feature vector, for example, a current driving status of a self-driving apparatus. F is an integer greater than 1. A process in which the task abstraction network and the shared policy network process the F tasks (a process in which a shared policy is executed to process the F tasks) is described in step 1202, and the F tasks are handled in a same manner. For a task, the task abstraction network performs feature extraction on a batch of historical paths of the task to obtain a task feature vector. The shared policy network processes a vector obtained by combining the task feature vector and a status vector corresponding to the task feature vector, and outputs an action (for example, a driving operation). A target device (for example, the self-driving apparatus) reaches a new state after performing the action. The shared policy network processes a vector obtained by combining the task feature vector and a new status vector (representing the new state), and outputs a new action. The foregoing operations are repeated until a status of the target device reaches a terminated state, that is, the task is completed. Optionally, before step 1202 is performed, the F batches of historical paths corresponding to the F tasks are obtained by using the method in the foregoing embodiment.

1203. Update a group of task abstraction network parameters of the task abstraction network with respect to each task by using a policy gradient method.

The F tasks correspond to F groups of task abstraction network parameters, that is, the task abstraction network has a group of task abstraction network parameters with respect to each task. The task abstraction network updates a group of abstraction module parameters with respect to each task at a target learning rate by using the policy gradient method, to obtain the F groups of task abstraction network parameters corresponding to the F tasks. The task abstraction network performs feature extraction on the task by using a group of task abstraction network parameters corresponding to each task, so that a task feature vector of each task can be extracted more accurately.

1204. Determine whether a quantity of inner-updates reaches a first threshold.

If the quantity of inner-updates reaches the first threshold, step 1205 is performed, or if the quantity of inner-updates does not reach the first threshold, step 1202 is performed. The first threshold may be an integer greater than 1, for example, ranging from 2 to 50. The quantity of inner-updates is a quantity of times the task abstraction network is updated with respect to a group of task abstraction network parameters corresponding to each task. For example, when the quantity of updates of the task abstraction network with respect to a group of task abstraction network parameters corresponding to any task exceeds a first threshold, updating the group of task abstraction network parameters corresponding to the task stops.

1205. Update the parameters of the task abstraction network, the parameters of the shared policy network, and the target learning rate.

Optionally, a mean of losses of a latest batch of historical paths of each of the F tasks is calculated to obtain F losses. Based on a loss obtained by combining the F losses, these parameters are updated by using a policy optimization method. Optionally, the parameters of the task abstraction network are updated by using gradient values of a second loss function relative to the parameters of the task abstraction network, the parameters of the shared policy network are updated by using gradient values of the second loss function relative to the parameters of the shared policy network, and the target learning rate is updated by using gradient values of the second loss function relative to the target learning rate. The second loss function is configured to calculate a sum of the F losses of the F tasks or a mean of the F losses, the F losses one-to-one correspond to the F tasks, a loss of any one of the F tasks is obtained through calculation based on a latest batch of historical paths of the any task, and F is an integer greater than 1.

1206. Determine whether a quantity of external updates reaches a second threshold.

The second threshold may be an integer greater than 1, for example, ranging from 20 to 120. The quantity of external updates is a quantity of updates of any one of the parameters of the task abstraction network, the parameters of the shared policy network, and the target learning rate.

1207. Input W batches of historical paths corresponding to W test tasks into the task abstraction network for feature extraction, to obtain W task feature vectors, where the shared policy network processes the W task feature vectors and status vectors corresponding to the W task feature vectors, to obtain W groups of historical paths that one-to-one correspond to the W test tasks.

The W test tasks are new tasks used to test performance of the task abstraction network and performance of the shared policy network. The W batches of historical paths one-to-one correspond to the W test tasks. Because of a lack of historical paths of the W test tasks, a zero vector may be used as a task feature vector of each of the W test tasks. For a test task, the shared policy network independently processes the test task a plurality of times by using the zero vector as a task feature vector of the test task, to obtain a batch of historical paths. It may be understood that the shared policy network processes the test task once to obtain a group of historical paths.

1208. Update a group of task abstraction network parameters of the task abstraction network with respect to each test task by using a policy gradient method.

1209. Determine whether the quantity of inner-updates reaches a third threshold.

If the quantity of inner-updates reaches the third threshold, step 1210 is performed, or if the quantity of inner-updates reaches the third threshold, step 1207 is performed. The third threshold may be an integer greater than 1, for example, ranging from 2 to 50.

1210. Output a test result.

The test result may include a return obtained by each test task, a historical path of each test task, and the like. In actual application, the performance of the task abstraction network and the performance of the shared policy network are determined based on the test result, so as to determine whether to continue training.

In this embodiment of this application, before task abstraction features of a task are extracted by using the task abstraction network, a group of task abstraction network parameters of the task abstraction network with respect to the task are optimized, so that a better task feature vector can be extracted. A meta-update is performed with reference to information about all the tasks, so that the shared policy network processes each task efficiently.

The following describes the technical solutions of this application by using a navigation problem on a two-dimensional plane as an example. For such type of navigation problem, a good policy is expected to enable the self-driving apparatus (agent) to start from a given start point and reach a specified target point as soon as possible. Three specific examples are considered: (1) two-dimensional navigation (2D navigation), where a status of the agent is a location in directions x and y, and actions of the agent are displacement in two directions, (2) a problem of sliding locomotion (sliding locomotion) problem in MuJoCo (a simulation environment in which some reinforcement learning scenarios can be simulated), where the agent moves under action of the forces in the directions x and y, actions of the agent are magnitudes of the forces in the two directions, and statuses of the agent include a total of four dimensions: locations and speeds in the two directions, and (3) a problem of wheeled locomotion (wheeled locomotion) in MuJoCo, where the agent moves under action of a torque, actions of the action are magnitudes of two torques, and statuses include a total of eight dimensions such as a location, a speed, and an azimuth. Action space and status space of all agents are continuous.

The following describes an embodiment of resolving the foregoing navigation problems by using a solution in the embodiments of this application.

1. Task Preparation Process: Generate a Training Set and a Test Set.

For the three navigation problems, it is assumed that the state space is a rectangular area centered on a zero point, initial states of all tasks are in the rectangular area, but a state of the agent in a movement process is not limited. 200 different points are randomly sampled in the state space, where 100 points are used to construct the training set, the other 100 points are used to construct the test set, and start points of all tasks are set to zero.

2. Training Process:

(1) Initialize parameters of a task abstraction network, parameters of a shared policy network, and a target learning rate.

The task abstraction network is a GRU network, a hidden layer has a length of 64, and a parameter of the task abstraction network is denoted as $\theta_{TA}$. An input of the task abstraction network is a group (or a batch) of historical paths, that is, including a sequence of information such as a status, an action, and a return at each time step. The last layer of the task abstraction network is a fully connected layer, and the fully connected layer maps information from the hidden layer to a four-dimensional task feature vector. The target learning rate is a tensor that has a same value as $\theta_{TA}$, and all elements are initialized to 0.01. During the inner-update of the task, the parameter $\theta_{TA}$ of the task abstraction network is updated based on the target learning rate by using the policy gradient method, but a remains unchanged during the inner-update of the task. The shared policy network is a two-layer deep neural network/multi-layer perceptron and has a width of 64, and a parameter of the shared policy network is denoted as $\theta_{policy}$. An input of the shared policy network is a task feature vector output by the task abstraction network and a status vector at each time step, and an output is an action. In this embodiment of this application, the parameters of the task abstraction network and the parameters of the shared policy network may be initialized in any neural network initialization manner, and an initialization manner is not limited.

(2) Batch sampling and inner-update of a task a. Randomly select 24 tasks from the training set.

b. The shared policy network processes each task independently 32 times by using a zero vector as a task feature vector of the task, to obtain 32 groups of historical paths of the task.

For a task, the shared policy network processes a vector obtained by combining the zero vector and an initial status vector, and outputs an action (for example, a driving operation). The target device (for example, a self-driving apparatus) reaches a new state after performing the action. The shared policy network processes a vector obtained by combining the zero vector and a new status vector (representing the new state), and outputs a new action. The foregoing operations are repeated until a status of the target device reaches a terminated state, that is, a group of historical paths are obtained. The shared policy network starts to process again a vector obtained by combining the zero vector and an initial status vector, until the status of the target device reaches a terminated state, to obtain another group of historical paths.

c. Input the 32 groups of historical paths of the task into the task abstraction network for feature extraction, to obtain 32 feature vectors corresponding to the task, and calculate a mean of the 32 feature vectors corresponding to the task, to obtain a task feature vector of the task.

d. The shared policy network independently processes the task 32 times by using the task feature vector of the task, to obtain again 32 groups of historical paths (32 new historical paths) of the task.

e. Calculate a sum of losses of the new 32 historical paths of the task, and update, by using gradient values of a first loss function relative to the parameters of the task abstraction network, a group of task abstraction parameters of the task abstraction network with respect to the task.

Updating a group of task abstraction parameters of the task abstraction network with respect to a task may be updating a group of relative parameters of the task abstraction network with respect to the task, so that differences between the parameters of the task abstraction network and the group of relative parameters are a group of task abstraction network parameters that are to be used by the task abstraction network to perform feature extraction on the task. The first loss function is configured to calculate a sum of losses of the 32 new historical paths of each task.

f. The task abstraction network uses a group of task abstraction parameters of the task abstraction network with respect to each task, as parameters for performing feature extraction on the task, and step c to step e are repeated a total of three times.

(3) Meta-Update a. Combine losses of a latest batch of historical paths of each task and calculate a mean to obtain a reference loss.

b. Calculate gradient values of the reference loss relative to a task abstraction module parameter $\theta_{TA}$, a policy sharing module parameter $\theta_{policy}$, and a target learning rate $\alpha$.

c. Update $\theta_{TA}$, $\theta_{policy}$, and a based on the obtained gradient values by using a proximal policy optimization (Proximal Policy Optimization, PPO) method.

d. Repeat steps (2) and (3) until a quantity of iterations reaches an upper limit.

The quantity of iterations is a quantity of updates of any one of the parameters of the task abstraction network, the parameters of the shared policy network, and the target learning rate.

(4) Test Process:

a. The parameters $\theta_{TA}$, $\theta_{policy}$, and $\alpha$ that are obtained through training are loaded to the task abstraction network, shared policy network, and learning rate, respectively.

b. Use all the 100 test tasks as an input, repeat step (2) a total of 50 times, and output a test result.

The test result may include a return obtained by each test task, a historical path of each test task, and the like.

The following describes technical effects achieved by the technical solutions in this application.

For a sliding locomotion scenario, a principal component analysis (Principal Component Analysis, PCA) method is used to reduce task feature vectors extracted after the task abstraction network performs iteration once, twice, and 50 times in the test process, to two dimensions, and draw them on a plane. In addition, a Pearson correlation coefficient (Pearson Correlation Coefficient, PCC) between a task feature vector in each iteration and a target point of a task is calculated.

Figure 13A:
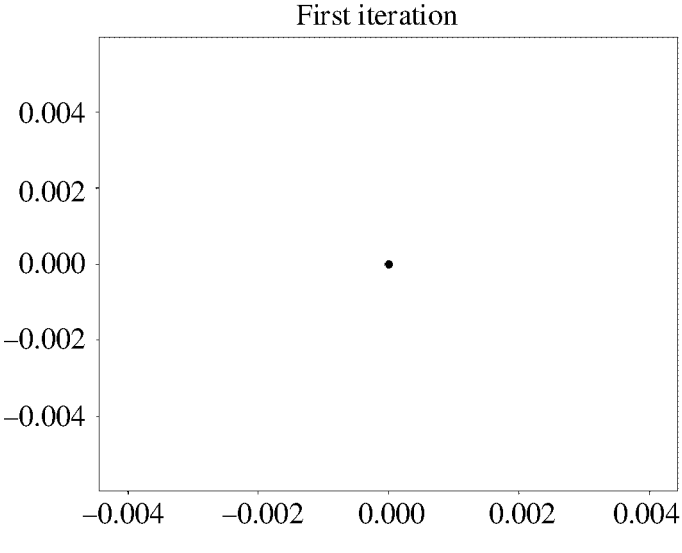
FIG. 13A to FIG. 13C are schematic diagrams of task feature vectors according to embodiments of this application.
Figure 13B:
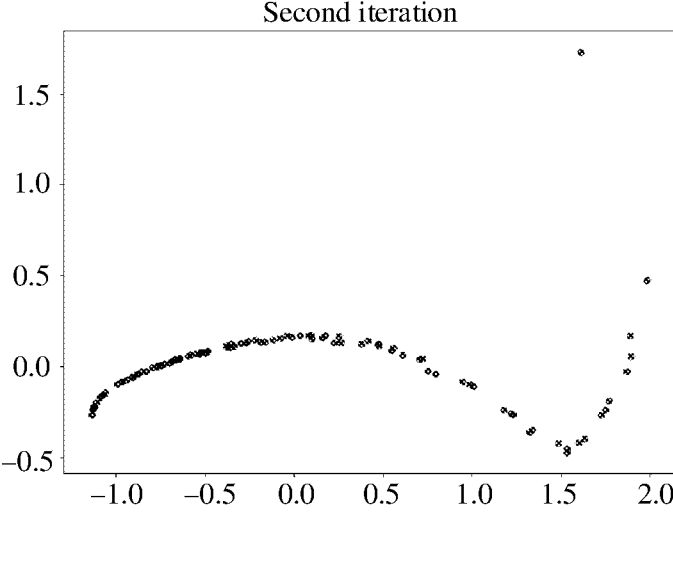
Figures 13C, 14A:
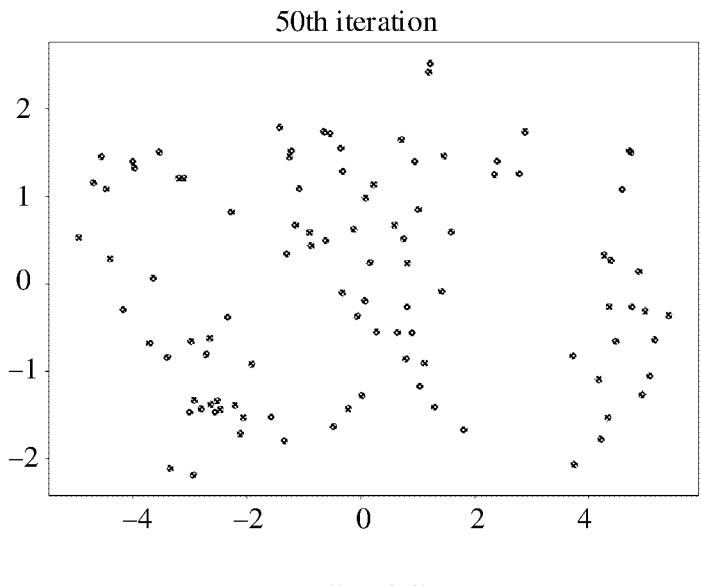
FIG. 14A to FIG. 14C are schematic diagrams of ADR curves according to embodiments of this application.

FIG. 13A shows a task feature vector extracted in the first iteration. FIG. 13B shows a task feature vector extracted in the second iteration. FIG. 13C shows a task feature vector extracted in the 50th iteration. As shown in FIG. 13A, in the first iteration, because there is no previous historical path, a task feature vector of each task is set to zero. As shown in FIG. 13B, in the second iteration, differences start to be reflected between tasks. As shown in FIG. 13C, in the 50th iteration of the task abstraction network, all 100 tasks are completely separated on a plane. This shows that the task abstraction network can effectively extract task features and effectively distinguish between different tasks.

TABLE 1

| Quantity of iterations | 1 | 2 | 3 | 4 | 5 | 50 |
|---|---|---|---|---|---|---|
| PCC | Nan | 0.09 | 0.35 | 0.60 | 0.75 | 0.88 |

Table 1 is a PCC coefficient table, and shows PCC coefficients between task feature vectors obtained after different quantities of iterations, and a target point of a task. It can be learned from Table 1 that, a relationship between a task feature vector of a task and a target point of the task gradually increases with a quantity of iterations. This indicates that the task feature vector extracted by the task abstraction network is related to a real feature (that is, the target point) of the task, and the correlation gradually increases significantly with the iteration.

The following compares test effects, in three navigation scenarios, of a conventional policy-based reinforcement learning method (PPO+MLP or PPO+RNN), an existing meta-reinforcement learning method (MAML+MLP, MAML+RNN, Meta-SGD+MLP, Meta-SGD+RNN, or RL$^2$), and the method provided in the present invention. In all test experiments, 100 same test tasks are used, and a proximal policy optimization (Proximal Policy Optimization, PPO) method is used for 50 updates in each test task. PPO+MLP is a solution in which reinforcement learning is performed by using a PPO method and an MLP. PPO+RNN is a solution in which reinforcement learning is performed by using the PPO method and an RNN. MAML (Model-Agnostic Meta-Learning) is a meta-reinforcement learning method. An implementation method is as follows. A policy network is established, a current status is input, and an action is output. The policy network is trained by using a meta-learning method. That is, a meta-learner (meta-learner) uses small-sample-task training data to generate a learner (learner), and the learner completes prediction on a current task. MAML+MLP is a solution in which meta-reinforcement learning is performed by using the MAML method and by using the MLP as a policy network. MAML+RNN is a solution in which meta-reinforcement learning is performed by using the MAML method and by using the RNN as a policy network. An RL$^2$ (Fast Reinforcement Learning via Slow Reinforcement Learning) solution is as follows. An RNN policy network is established, a current status, action, and return, and the like are input, and an action is output, and a hidden layer of the RNN is configured to represent a task-specific feature. Meta-SGD is similar to MAML. A difference lies in that, in MAML, a learning rate is a constant, for example, 0.01, in Meta-SGD, a learning rate is a tensor of a same order and a same type as a parameter of a shared policy network.

Figure 14B:
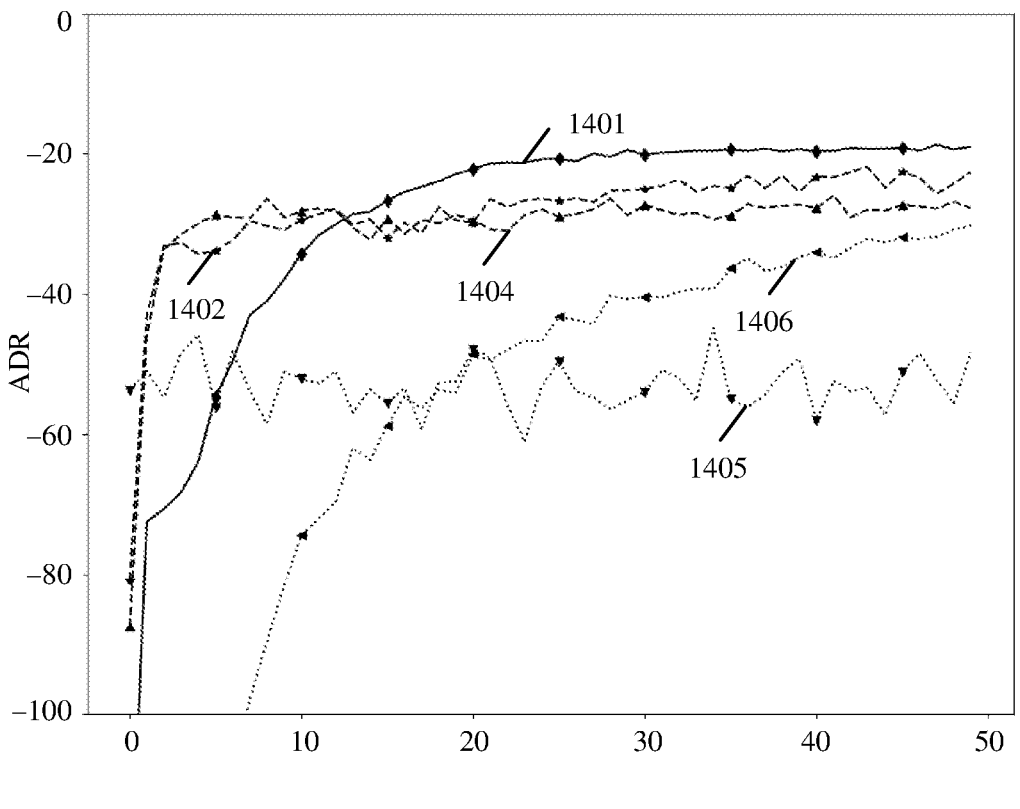
Figure 14C:
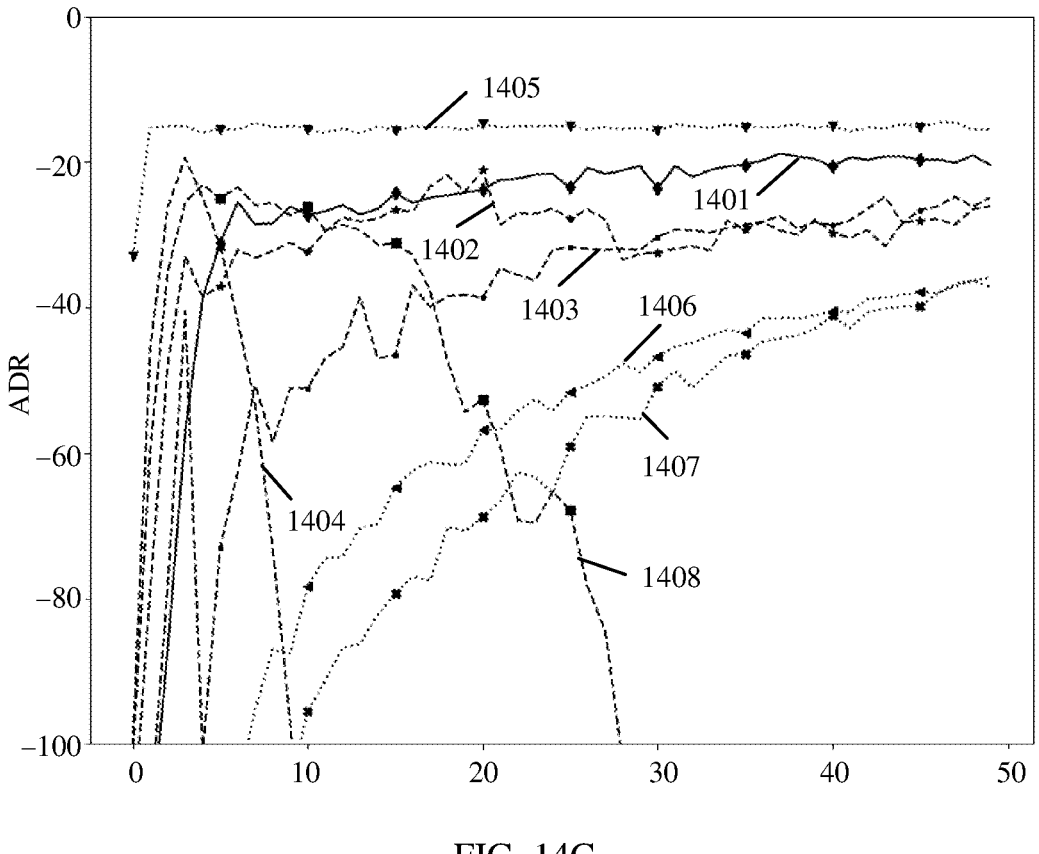

FIG. 14A, FIG. 14B, and FIG. 14C show, sequentially, average discounted return (ADR) curves obtained by executing a test task in the two-dimensional navigation (2D navigation) scenario, the sliding locomotion scenario, and the wheeled locomotion scenario by using the foregoing method. As shown in FIG. 14A to FIG. 14C, a horizontal coordinate represents a quantity of iterations, and a vertical coordinate represents an ADR, and 1401 represents an ADR curve in this solution, 1402 represents an ADR curve in MAML+RNN, 1403 represents an ADR curve in MAML+MLP, 1404 represents an ADR curve in Meta-SGD+RNN, 1405 represents an ADR curve in RL$^2$, 1406 represents an ADR curve in PPO+RNN, 1407 represents an ADR curve in PPO+MLP, and 1408 represents an ADR curve in Meta-SGD+MLP. From an ADR curve of each iteration, the following can be learned.

An effect of the conventional policy-based reinforcement learning method (PPO+MLP or PPO+RNN) is generally poor, the ADR obtained through 50 iterations is equivalent to only a result obtained through less than 10 updates in the meta-reinforcement learning method, and the ADR becomes stable gradually. It can be predicted that, even if there are enough iterations, a better policy applicable to all tasks cannot be learned in this type of method. This also proves a necessity of the meta-reinforcement learning method. This solution may also be a meta-reinforcement learning method.

Effects of an existing meta-reinforcement learning method such as MAML or Meta-SGD in first several iterations are improved obviously. However, as the update process continues, instability such as a sharp drop or fluctuation may occur on the ADR. This may be because the 50 inner-updates of the test task are inconsistent with inner-updates of a training task, or a method of mapping all information shared by the tasks to an initial value of a network may cause some instability when a fast update is performed for different tasks subsequently.

In verification in each scenario, this solution can quickly and smoothly obtain an effect better than other methods, indicating that the method in this solution can stably learn an excellent policy applicable to various tasks, has high efficiency, and has a strong generalization capability.

A same network framework (GRU+MLP) is used in the wheeled locomotion scenario. The following four different update modes are used.

For a batch of tasks, all parameters are updated by using a PPO method (a first mode).

All the parameters are updated in the task, and all the parameters are updated externally by using the PPO (a second mode).

In the task, parameters of a task abstraction network are updated at a fixed learning rate, and all parameters are updated externally by using the PPO (a third mode).

In the task, the parameters of the task abstraction network are updated at an adaptive learning rate, and all parameters are updated externally by using the PPO (a fourth mode).

Figure 15:
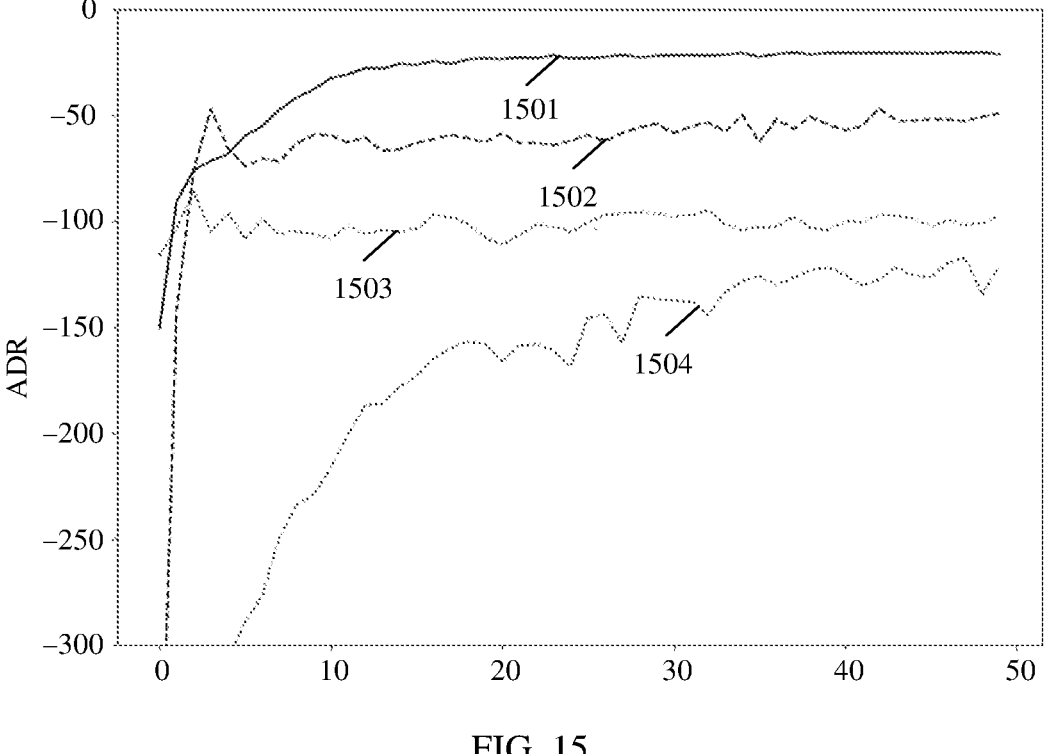
FIG. 15 is a schematic diagram of ADR curves of different updating manners according to an embodiment of this application.

FIG. 15 is a schematic diagram of ADR curves according to an embodiment of this application. A horizontal coordinate represents a quantity of iterations, and a vertical coordinate represents an ADR. As shown in FIG. 15, 1501 represents an ADR curve obtained in an update mode (the fourth mode) in this application, 1502 represents an ADR curve obtained in the third update mode, 1503 represents an ADR curve obtained in the second update mode, and 1504 represents an ADR curve obtained in the first update mode.

It can be learned from FIG. 15 that the update mode (the fourth mode) used in this application is the most stable, and a better solution than other methods can be quickly obtained.

The foregoing descriptions of the implementations allow a person skilled in the art to clearly understand that, for the purpose of convenient and brief description, division into the foregoing functional modules is taken as an example for illustration. In actual application, the foregoing functions can be allocated to different modules and implemented based on requirements, that is, an inner structure of an apparatus is divided into different functional modules to implement all or some of the functions described above.

In the several embodiments provided in this application, it should be understood that the disclosed apparatus and method may be implemented in other manners. For example, the apparatus embodiment described above is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed to different places. Some or all of the units may be selected based on actual requirements to achieve the objectives of the solutions of the embodiments.

In addition, the functional units in the embodiments of this application may be integrated into one processing unit, or each of the units may exist alone physically, or two or more units are integrated into one unit. The integrated unit may be implemented in a form of hardware, or may be implemented in a form of a software functional unit.

All or some of the methods in the embodiments of this application may be implemented by using software, hardware, firmware, or any combination thereof. When software is used to implement the embodiments, all or some of the embodiments may be implemented in a form of a computer program product. The computer program product includes one or more computer instructions.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A self-driving method, comprising:

obtaining a self-driving task by a self-driving apparatus;

determining, by the self-driving apparatus, during performance of the self-driving task, a task feature vector of the self-driving task according to M groups of historical paths of the self-driving task, wherein the task feature vector is a vector representing features of the self-driving task, wherein M is an integer greater than 0, wherein each historical path of the M groups of historical paths comprises at least one tuple corresponding to a time step, wherein each tuple comprises a driving status of the self-driving apparatus at a corresponding time step after the self-driving apparatus performs a driving operation at a previous time step, a driving operation performed by the self-driving apparatus at the corresponding time step, and a reward value obtained by the self-driving apparatus by performing the driving operation at the corresponding time step, wherein the determining the task feature vector comprises obtaining, by the self-driving apparatus, the M groups of historical paths, wherein the determining the task feature vector further comprises obtaining M groups of intermediate feature vectors by performing, by the self-driving apparatus, feature extraction on the M groups of historical paths to generate task features using a task abstraction network comprising one or more hidden layers and a final layer that is a fully connected layer, and wherein the task features are extracted at the one or more hidden layers to generate M groups of intermediate feature vectors, that are mapped, by the fully connected layer, to the task feature vector, which is an H-dimensional feature vector;

updating, by the self-driving apparatus, before the obtaining the M groups of historical paths and according to N losses corresponding to N groups of historical paths, a group of task abstraction network parameters corresponding to the self-driving task using at least gradient values of a first loss function relative to parameters of the task abstraction network;

determining, by the self-driving apparatus, according to the task feature vector and a status vector, a target driving operation that needs to be performed, wherein the status vector indicates a driving status of the self-driving apparatus, wherein the status vector is a vector generated by the self-driving apparatus based on data sensed by a sensor system of the self-driving apparatus and represents a driving status of the self-driving apparatus at a time step, wherein the status vector comprises at least a location, a speed, a steering angle, and an acceleration of the self-driving apparatus, and further comprises a status of an ambient environment of the self-driving apparatus, wherein the status vector is a G-dimensional vector, wherein the target driving operation that needs to be performed is determined by providing the task feature vector and the status vector as inputs to a shared policy network, and wherein the target driving operation that needs to be performed is further determined according to a relationship between a target threshold and a value obtained by dividing G by H; and performing, by the self-driving apparatus, the target driving operation by generating a control instruction associated with the target driving operation and indicating one or more operational parameters for one or more controls of a vehicle controlled by the self-driving apparatus, and further by sending the control instruction to a control system, wherein sending the control instruction to the control system causes the control system to control the one or more controls according to the control instruction and further causes the self-driving apparatus to perform the self-driving task based on the target driving operation;

wherein a calculation formula of the first loss function is:

$$L(\theta_{TA}) = E_\tau \left[ \sum_{t=0}^{H} \left( \log \pi_{\theta\,policy}(a_t \mid s_t, h(\theta_{TA})) \left( \sum_{t'=t}^{H} r_{t'} - b(s_t) \right) \right) \right];$$

wherein $\theta_{TA}$ represents a parameter of the task abstraction network, wherein $\phi_{\theta_{policy}}(a_t|s_t,h(\theta_{TA}))$ represents a probability that an input of the shared policy network is a status vector $s_t$ and a feature vector $h(\theta_{TA})$ and an output is a driving operation $a_t$, wherein H is a maximum quantity of points, wherein t represents a time point, wherein $b(s_t)$ represents a reference function used to calculate a return obtained by the self-driving apparatus at the time point t, wherein $r_t'$ represents a real return obtained by the self-driving apparatus at the time point t, and wherein $E_\tau$ [ ] represents calculating an expectation in a bracket.

2. The method according to claim 1, wherein the M groups of intermediate feature vectors correspond in a one-to-one manner to the M groups of historical paths.

3. The method according to claim 2, wherein the shared policy network is a neural network implementing reinforcement learning.

4. The method according to claim 3, wherein the obtaining the M groups of historical paths comprises obtaining at least one group of historical paths of the M groups of historical paths by performing:

obtaining a first driving operation by processing, by the self-driving apparatus, a reference feature vector and a first status vector using the shared policy network, wherein the reference feature vector is one of a zero vector or a feature vector that is of the self-driving task and that is determined according to N groups of historical paths of the self-driving task, wherein the first status vector indicates a driving status of the self-driving apparatus at a first time point, and wherein N is an integer greater than 0;

performing, by the self-driving apparatus, the first driving operation at the first time point;

obtaining, by the self-driving apparatus, a driving status of the self-driving apparatus at a second time point and a return for performing the first driving operation, wherein the second time point is a next time point of the first time point; and determining, by the self-driving apparatus, a group of historical paths according to information about T time points for completing or executing the self-driving task, wherein the T time points comprise the first time point, wherein information about any one time point of the T time points comprises a driving status of the self-driving apparatus at the any one time point, a driving operation performed by the self-driving apparatus at the any one time point, and a return obtained by the self-driving apparatus at the any one time point, and wherein T is an integer not less than 1.

5. The method according to claim 4, further comprising performing, before the processing the reference feature vector:

obtaining, by the self-driving apparatus, the N groups of historical paths, wherein the N losses correspond in a one-to-one manner to the N groups of historical paths;

obtaining N intermediate feature vectors by performing, by the self-driving apparatus, feature extraction on the N groups of historical paths using the task abstraction network, wherein the N intermediate feature vectors correspond in a one-to-one manner to the N groups of historical paths, and wherein the task abstraction network processes the N groups of historical paths using the group of task abstraction network parameters; and determining, by the self-driving apparatus, the reference feature vector according to the N intermediate feature vectors.

6. The method according to claim 5, wherein the updating the group of task abstraction network parameters comprises:

updating, by the self-driving apparatus using the gradient values of the first loss function relative to parameters of the task abstraction network, a group of relative parameters of the task abstraction network with respect to the self-driving task, wherein the group of task abstraction network parameters comprises differences between the parameters of the task abstraction network and the group of relative parameters, and wherein the first loss function provides a sum of the N losses.

7. The method according to claim 5, further comprising:

updating, by the self-driving apparatus, parameters of the task abstraction network using gradient values of a second loss function relative to the parameters of the task abstraction network, wherein the second loss function provides at least one of a sum of F losses of F tasks or a mean of the F losses, wherein the F losses correspond in a one-to-one manner to the F tasks, wherein a loss of any one task of the F tasks is obtained through calculation according to a latest batch of historical paths of the any one task, and wherein F is an integer greater than 1; and updating, by the self-driving apparatus, parameters of the shared policy network using gradient values of the second loss function relative to the parameters of the shared policy network.

8. The method according to claim 7, further comprising:

updating, by the self-driving apparatus, a target learning rate using gradient values of the second loss function relative to the target learning rate, wherein the target learning rate is a learning rate for updating the group of task abstraction network parameters of the task abstraction network with respect to the self-driving task.

9. The method according to claim 8, wherein a calculation formula of the second loss function is:

$$L(\theta)=E_t[\min\{r_t(\theta)A_t,\text{clip}(r_t(\theta),1-\varepsilon,1+\varepsilon,r_t(\theta))A_t\}-\beta KL[\pi_{\theta_{old}},\pi_\theta]];$$

wherein $\theta=\{\theta_{TA}, \theta_{policy}, \alpha\}$, wherein $\theta_{TA}$ represents a parameter of the task abstraction network, wherein $\theta_{policy}$ represents a parameter of the shared policy network, and $\alpha$ represents the target learning rate, wherein $$r_t(\theta) = \frac{\pi_\theta(a_t \mid s_t)}{\pi_{\theta_{old}}(a_t \mid s_t)},$$

wherein $\pi_\theta(a_t|s_t)$ represents a probability that, after $\theta$ is updated, an input of the shared policy network is a status vector $s_t$ and an output is a driving operation $a_t$, wherein $\phi_{\theta_{old}}(a_t|s_t)$ represents a probability that, before $\theta$ is updated, an input of the shared policy network is the status vector $s_t$ and an output is the driving operation $a_t$, wherein $$A_t = \sum_{t'=t}^{H} r_{t'} - b(s_t),$$

wherein H is a maximum quantity of points, wherein $b(s_t)$ represents a reference function used to calculate a return obtained by the self-driving apparatus at a time point t, wherein $r_t'$ represents a real return obtained by the self-driving apparatus at the time point t, wherein clip $(r_t(\theta), 1-\varepsilon, 1+\varepsilon, r_t(\theta))$ represents that a minimum value of $r_t(\theta)$ is $1-\varepsilon$, a maximum value of $r_t(\theta)$ is $1+\varepsilon$, and $\varepsilon$ is a constant term greater than 0, wherein $KL[\pi_{(\theta\_old)},\pi\_\theta]]$ represents relative entropy of two probability distributions obtained before and after $\theta$ is updated, and $\beta$ is a hyperparameter, wherein and $E_t[\ ]$ represents calculating an expectation in a bracket.

10. A self-driving apparatus, comprising:

a processor;

a control system; and a non-transitory computer readable medium connected to the processor and storing program for execution by the processor, the program including instructions to:

obtain a self-driving task by the self-driving apparatus;

determine, during performance of the self-driving task by the self-driving apparatus, a task feature vector of the self-driving task based on M groups of historical paths of the self-driving task, wherein the task feature vector is a vector representing features of the self-driving task, wherein M is an integer greater than 0, wherein each historical path of the M groups of historical paths comprises at least one tuple corresponding to a time step, wherein each tuple comprises a driving status of the self-driving apparatus at a corresponding time step after the self-driving apparatus performs a driving operation at a previous time step, a driving operation performed by the self-driving apparatus at the corresponding time step, and a reward value obtained by the self-driving apparatus by performing the driving operation at the corresponding time step, wherein the determining the task feature vector comprises obtaining, by the self-driving apparatus, the M groups of historical paths, wherein the determining the task feature vector further comprises obtaining M groups of intermediate feature vectors by performing, by the self-driving apparatus, feature extraction on the M groups of historical paths to generate task features using a task abstraction network comprising one or more hidden layers and a final layer that is a fully connected layer, and wherein the task features are extracted at the one or more hidden layers to generate M groups of intermediate feature vectors, that are mapped, by the fully connected layer, to the task feature vector, which is an H-dimensional feature vector;

update, before the obtaining the M groups of historical paths and according to N losses corresponding to N groups of historical paths, a group of task abstraction network parameters corresponding to the self-driving task using at least gradient values of a first loss function relative to parameters of the task abstraction network;

determine, according to the task feature vector and a status vector, a target driving operation that needs to be performed, wherein the status vector indicates a driving status of the self-driving apparatus, wherein the status vector is a vector generated by the self-driving apparatus based on data sensed by a sensor system of the self-driving apparatus and represents a driving status of the self-driving apparatus at a time step, wherein the status vector comprises at least a location, a speed, a steering angle, and an acceleration of the self-driving apparatus, and further comprises a status of an ambient environment of the self-driving apparatus, wherein the status vector is a G-dimensional vector, wherein the target driving operation that needs to be performed is determined by providing the task feature vector and the status vector as inputs to a shared policy network, and wherein the target driving operation that needs to be performed is determined according to a relationship between a target threshold and a value obtained by dividing G by H; and cause the control system to control the self-driving apparatus to perform the target driving operation by generating a control instruction associated with the target driving operation and indicating one or more operational parameters for one or more controls of a vehicle controlled by the self-driving apparatus, and further by sending the control instruction to the control system, wherein sending the control instruction to the control system causes the control system to control the one or more controls according to the control instruction and further causes the self-driving apparatus to perform the self-driving task based on the target driving operation;

wherein a calculation formula of the first loss function is:

$$L(\theta_{TA}) = E_{\tau}\left[\sum_{t=0}^{H}\left(\log \pi_{\theta_{policy}}(a_t \mid s_t, h(\theta_{TA}))\left(\sum_{t'=t}^{H} r_{t'} - b(s_t)\right)\right)\right];$$

wherein $\theta_{TA}$ represents a parameter of the task abstraction network, wherein $\pi_{\theta_{policy}}(a_t \mid s_t, h(\theta_{TA}))$ represents a probability that an input of the shared policy network is a status vector $s_t$ and a feature vector $h(\theta_{TA})$ and an output is a driving operation $a_t$, wherein H is a maximum quantity of points, wherein t represents a time point, wherein $b(s_t)$ represents a reference function used to calculate a return obtained by the self-driving apparatus at the time point t, wherein $r_t'$ represents a real return obtained by the self-driving apparatus at the time point t, and wherein $E_{\tau}$ [ ] represents calculating an expectation in a bracket.

11. The self-driving apparatus according to claim 10, wherein the M groups of intermediate feature vectors correspond in a one-to-one manner to the M groups of historical paths.

12. The self-driving apparatus according to claim 11, wherein the shared policy network is a neural network configured to implement reinforcement learning.

13. The self-driving apparatus according to claim 12, wherein the instructions to obtain the M groups of historical paths include instructions to obtain at least one group of historical paths of the M groups of historical paths, and wherein the instructions to obtain at least one group of historical paths of the M groups of historical paths include instructions to:

obtain a first driving operation by processing a reference feature vector and a first status vector using the shared policy network, wherein the reference feature vector is at least one of a zero vector or a feature vector that is of the self-driving task and that is determined according to N groups of historical paths of the self-driving task, wherein the first status vector represents a driving status of the self-driving apparatus at a first time point, and wherein N is an integer greater than 0;

cause the control system to control the self-driving apparatus to perform the first driving operation at the first time point;

obtain a driving status of the self-driving apparatus at a second time point and a return for performing the first driving operation, wherein the second time point is a next time point of the first time point; and determine a group of historical paths according to information about T time points for completing or executing the self-driving task, wherein the T time points comprise the first time point, wherein information about any one time point of the T time points comprises a driving status of the self-driving apparatus at the any one time point, a driving operation performed by the self-driving apparatus at the any one time point, and a return obtained by the self-driving apparatus at the any one time point, and wherein T is an integer not less than 1.

14. The self-driving apparatus according to claim 13, the program further includes instructions to:

obtain the N groups of historical paths, wherein the N losses correspond in a one-to-one manner to the N groups of historical paths;

obtain N intermediate feature vectors by performing feature extraction on the N groups of historical paths using the task abstraction network, wherein the N intermediate feature vectors correspond in a one-to-one manner to the N groups of historical paths, and wherein the task abstraction network processes the N groups of historical paths using the group of task abstraction network parameters; and determine the reference feature vector according to the N intermediate feature vectors.

15. The self-driving apparatus according to claim 14, wherein the instructions to update the group of task abstraction network parameters include instructions to:

update a group of relative parameters of the task abstraction network with respect to the self-driving task using the gradient values of the first loss function relative to parameters of the task abstraction network, wherein the group of task abstraction network parameters are differences between the parameters of the task abstraction network and the group of relative parameters, and wherein the first loss function provides a sum of the N losses.

16. The self-driving apparatus according to claim 14, wherein the program further includes instructions to:

update parameters of the task abstraction network by using gradient values of a second loss function relative to the parameters of the task abstraction network, wherein the second loss function is configured to provide at least one of a sum of F losses of F self-driving tasks or a mean of the F losses, wherein the F losses correspond in a one-to-one manner to the F self-driving tasks, wherein a loss of any one task of the F self-driving tasks is obtained through calculation based on a latest batch of historical paths of the any one task, and wherein F is an integer greater than 1; and update parameters of the shared policy network using gradient values of the second loss function relative to the parameters of the shared policy network.

17. The self-driving apparatus according to claim 16, wherein the program further includes instructions to update a target learning rate using gradient values of the second loss function relative to the target learning rate, wherein the target learning rate is a learning rate for updating the group of task abstraction network parameters of the task abstraction network with respect to the self-driving task.

18. The self-driving apparatus according to claim 17, wherein a calculation formula of the second loss function is:

$$L(\theta)=E_t[\min\{r_t(\theta)A_t,\mathrm{clip}(r_t(\theta),1-\varepsilon,1+\varepsilon,r_t(\theta))A_t\}-\beta KL\\ [\pi_{\theta_{old}},\pi_\theta]];$$

wherein $\theta=\{\theta_{TA},\ \theta_{policy},\ \alpha\}$, wherein $\theta_{TA}$ represents a parameter of the task abstraction network, $\theta_{policy}$ represents a parameter of the shared policy network, and $\alpha$ represents the target learning rate, wherein $$r_t(\theta)=\frac{\pi_\theta(a_t\mid s_t)}{\pi_{\theta_{old}}(a_t\mid s_t)},$$

wherein $\pi_\theta(a_t|s_t)$ represents a probability that, after $\theta$ is updated, an input of the shared policy network is a status vector $s_t$ and an output is a driving operation $a_t$, wherein $\pi_{\theta_{old}}(a_t|s_t)$ represents a probability that, before e is updated, an input of the shared policy network is the status vector $s_t$ and an output is the driving operation $a_t$;

$$A_t=\sum_{t'=t}^{H}r_t'-b(s_t),$$

wherein H is a maximum quantity of points, $b(s_t)$ represents a reference function used to calculate a return obtained by the self-driving apparatus at a time point t, wherein $r_t'$ represents a real return obtained by the self-driving apparatus at the time step t, wherein clip $(r_t(\theta),\ 1-\varepsilon,\ 1+\varepsilon,\ r_t(\theta))$ represents that a minimum value of $r_t(\theta)$ is $1-\varepsilon$, a maximum value of $r_t(\theta)$ is $1+\varepsilon$, and $\varepsilon$ is a constant term greater than 0; KL$[\pi\_(\theta\_old),\pi\_\theta]$ represents relative entropy of two probability distributions obtained before and after $\theta$ is updated, wherein $\beta$ is a hyperparameter, and wherein $E_t[\ ]$ represents calculating an expectation in a bracket.

\* \* \* \* \*